United States Patent
Vallery et al.

(10) Patent No.: US 11,794,982 B2
(45) Date of Patent: Oct. 24, 2023

(54) SYSTEMS AND METHODS FOR PHARMACEUTICAL PACKAGE DELIVERY

(71) Applicant: Express Scripts Strategic Development, Inc., St. Louis, MO (US)

(72) Inventors: Christina M. Vallery, Austin, TX (US); Jacob J. Reinhardt, Wentzville, MO (US); Cory B. Fross, Gilbert, AZ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 18/119,928

(22) Filed: Mar. 10, 2023

(65) Prior Publication Data

US 2023/0211936 A1 Jul. 6, 2023

Related U.S. Application Data

(63) Continuation of application No. 17/981,570, filed on Nov. 7, 2022, now Pat. No. 11,639,262, which is a continuation of application No. 17/403,387, filed on Aug. 16, 2021, now Pat. No. 11,511,924, which is a continuation of application No. 16/730,016, filed on Dec. 30, 2019, now Pat. No. 11,091,309.

(51) Int. Cl.
| | |
|---|---|
| *B65D 81/20* | (2006.01) |
| *B64F 1/32* | (2006.01) |
| *B64C 39/02* | (2023.01) |
| *A47G 29/14* | (2006.01) |
| *B64U 101/60* | (2023.01) |
| *B64U 10/13* | (2023.01) |

(52) U.S. Cl.
CPC ............ *B65D 81/20* (2013.01); *B64C 39/024* (2013.01); *B64F 1/32* (2013.01); *A47G 29/141* (2013.01); *A47G 2029/143* (2013.01); *A47G 2029/146* (2013.01); *A47G 2029/147* (2013.01); *B64U 10/13* (2023.01); *B64U 2101/60* (2023.01)

(58) Field of Classification Search
None
See application file for complete search history.

(56) References Cited

U.S. PATENT DOCUMENTS 11,511,924 B2 * 11/2022 Vallery .................. B65D 81/20

* cited by examiner

*Primary Examiner* — K. Wong
(74) *Attorney, Agent, or Firm* — Stinson LLP

(57) ABSTRACT

A pharmaceutical package for carrying a pharmaceutical container includes a first housing and a second housing in the first housing. The second housing defines a compartment sized and shaped to receive and carry the pharmaceutical container. A gas chamber is disposed between the first and second housings. The gas chamber is configured to hold a gas in an inflated state of the gas chamber. A passage extends from the first housing to the second housing and defines a passageway extending there-between to allow the pharmaceutical container to be positioned in the compartment of the second housing by moving the pharmaceutical container through the passageway. One or more supports are connected to and extending between the first housing and the second housing. The one or more supports secure and hold the second housing in the first housing.

20 Claims, 11 Drawing Sheets

FIG. 9
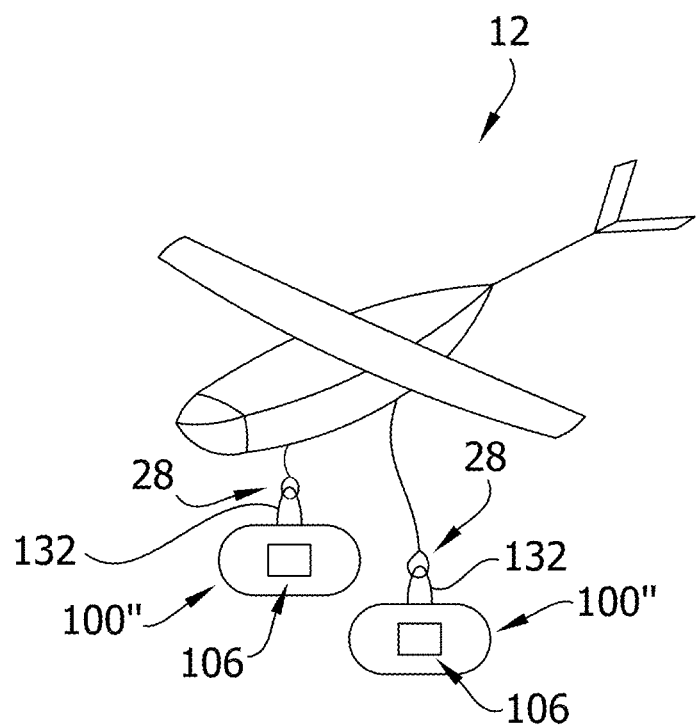
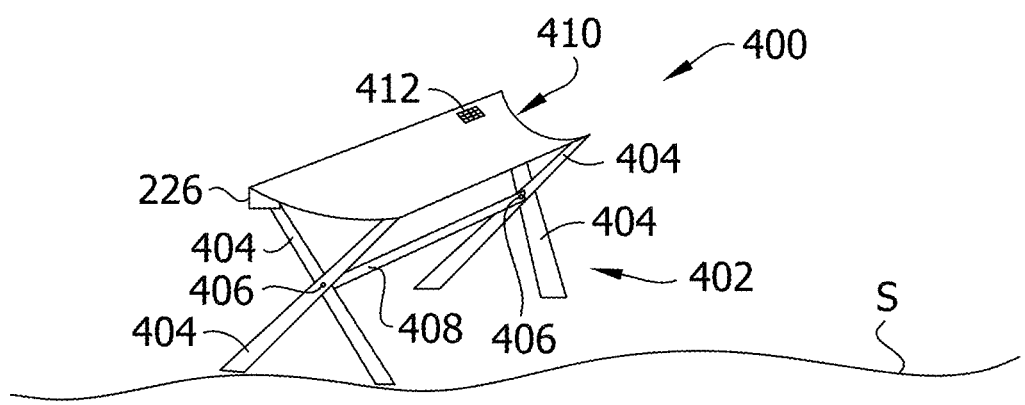

SYSTEMS AND METHODS FOR PHARMACEUTICAL PACKAGE DELIVERY

CROSS REFERENCE TO RELATED APPLICATIONS

This application is a continuation of U.S. application Ser. No. 17/981,570, which was filed on Nov. 7, 2022; said application Ser. No. 17/981,570 is a continuation of U.S. application Ser. No. 17/403,387, which was filed on Aug. 16, 2021 and issued on Nov. 29, 2022 as U.S. Pat. No. 11,511,924; said application Ser. No. 17/403,387 is a continuation of U.S. application Ser. No. 16/730,016, which was filed Dec. 30, 2019 and issued on Aug. 17, 2021 as U.S. Pat. No. 11,091,309. The entire disclosures of said applications are incorporated herein by reference.

FIELD

The present disclosure generally relates to package delivery systems, and more particularly to package delivery systems for delivering pharmaceutical containers.

BACKGROUND

Packages are used to deliver items to businesses and residences throughout the world. One such item frequently delivered in packages to consumers are pharmaceutical containers containing pharmaceuticals. Conventionally, these packages are delivered to businesses and residences using land based vehicles, such as trucks, but the development of aerial based delivery vehicles, such as drones, unmanned aerial vehicles (UAVs), etc., has opened up other delivery methods.

SUMMARY

In one aspect, a pharmaceutical package for carrying a pharmaceutical container comprises a first housing defining an interior and a first housing opening sized and shaped to allow the pharmaceutical container to pass into the interior. A second housing is in the first housing. The second housing defines a compartment and a second housing opening. The compartment is sized and shaped to receive and carry the pharmaceutical container. The second housing opening is in communication with the compartment and sized and shaped to allow the pharmaceutical container to pass into the compartment. A gas chamber is disposed between the first and second housings. The gas chamber is configured to hold gas in an inflated state of the gas chamber. A passage extends from the first housing to the second housing and defines a passageway extending between the first housing opening and the second housing opening to allow the pharmaceutical container to be positioned in the compartment of the second housing by moving the pharmaceutical container through the first housing opening, the passageway and the second housing opening. One or more supports are connected to and extend between the first housing and the second housing. The one or more supports secure and hold the second housing in the first housing.

In another aspect, a catcher for catching a package delivered by an unmanned aerial vehicle comprises a chute extending from an upper end to a lower end and defining a passageway between the upper and lower ends. The passageway is configured to receive the package when the package is dropped by the unmanned aerial vehicle into the chute. An enclosure mount is coupled to the chute and is configured to mount to an enclosure to couple the catcher to the enclosure. A door is configured to move between an open position and a closed position to open and close the passageway. A door actuator is operatively coupled to the door to control the door to permit the package to pass the door. A controller is communicatively coupled to the door actuator and includes a communications port, a processor and a non-transitory tangible storage medium including processor executable instructions for controlling the operation of the processor. The instructions include instructions for selectively actuating the door actuator to permit the package to pass the door responsive to the controller receiving a signal from the unmanned aerial vehicle via the communications port.

In another aspect, a catcher for catching a package delivered by an unmanned aerial vehicle comprises a base including at least two legs. A collector is connected to an upper end of the base and is configured to catch the package when the package is dropped by the unmanned aerial vehicle into the collector. A communications interface is configured to communicate with the unmanned aerial vehicle. The communications interface includes a communications port configured to send and receive signals from the unmanned aerial vehicle, a processor and a non-transitory tangible storage medium including processor executable instructions for controlling the operation of the processor. The instructions include instructions for sending an identity of the catcher via the communications port to the unmanned aerial vehicle.

In another aspect, a catcher for catching a package delivered by an unmanned aerial vehicle comprising a housing configured to mount to an enclosure to couple the catcher to the enclosure. A collector is movably coupled to the housing. The collector is movable between a collection position where the collector is configured to receive the package when the package is dropped by the unmanned aerial vehicle and a retracted position. A prime mover is operatively coupled to the collector to move the collector between the collection position and the retracted position. A controller is communicatively coupled to the prime mover and includes a communications port, a processor and a non-transitory tangible storage medium including processor executable instructions for controlling the operation of the processor. The instructions include instructions for selectively activating the prime mover to move the collector toward the collection position when the controller receives a signal from the unmanned aerial vehicle via the communications port.

Other objects and features of the present disclosure will be in part apparent and in part pointed out herein.

BRIEF DESCRIPTION OF THE DRAWINGS

FIG. 9 is an illustration of a pharmaceutical package delivery system according to another embodiment of the present disclosure.

Corresponding reference characters indicate corresponding parts throughout the drawings.

DETAILED DESCRIPTION

Figure 1:
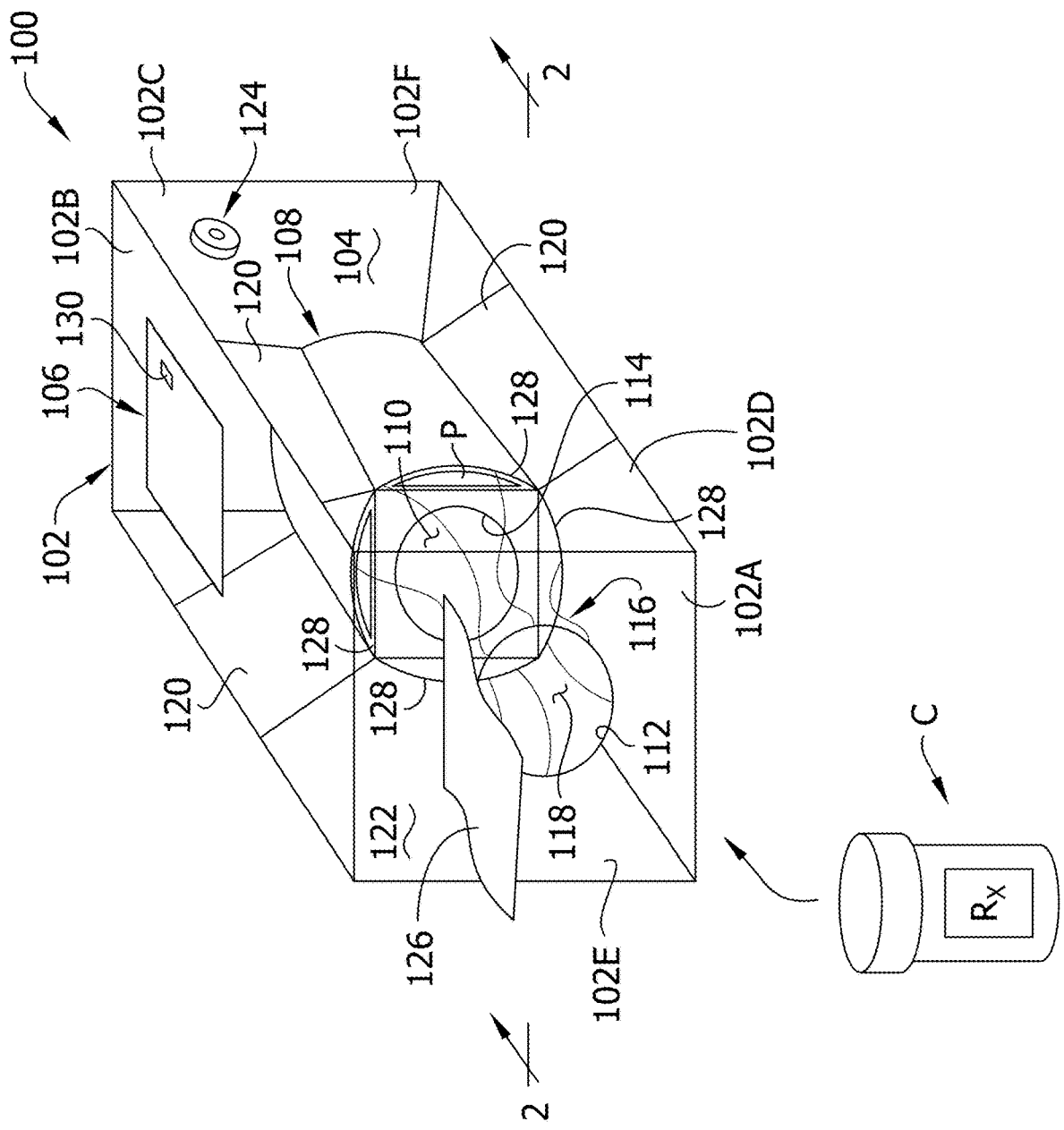
FIG. 1 is a perspective of a pharmaceutical package according to one embodiment of the present disclosure.

Referring to the drawings, FIG. 1 illustrates a pharmaceutical package embodying aspects of the present disclosure, indicated generally by reference numeral 100. As will become apparent, the pharmaceutical package 100 is an inflatable package. The pharmaceutical package 100 may be used to deliver a pharmaceutical container C containing pharmaceuticals to a consumer. The pharmaceutical package 100 may be used in an pharmaceutical package delivery system, such as the pharmaceutical package delivery system generally indicated by reference numeral 10 in FIG. 5. Generally, a pharmaceutical package delivery system 10 includes the pharmaceutical package 100, a carrier, generally indicated at 12, and a catcher, generally indicated at 200. As will become apparent, this disclosure describes a variety of pharmaceutical packages, carriers and catchers and it is understood a pharmaceutical package delivery system may comprise any combination and number of said pharmaceutical packages, carriers and catchers described herein. It is understood the systems and methods described herein are not limited to the delivery of pharmaceutical containers and that the systems and methods described herein can be used to deliver any type of item or device.

Figure 5:
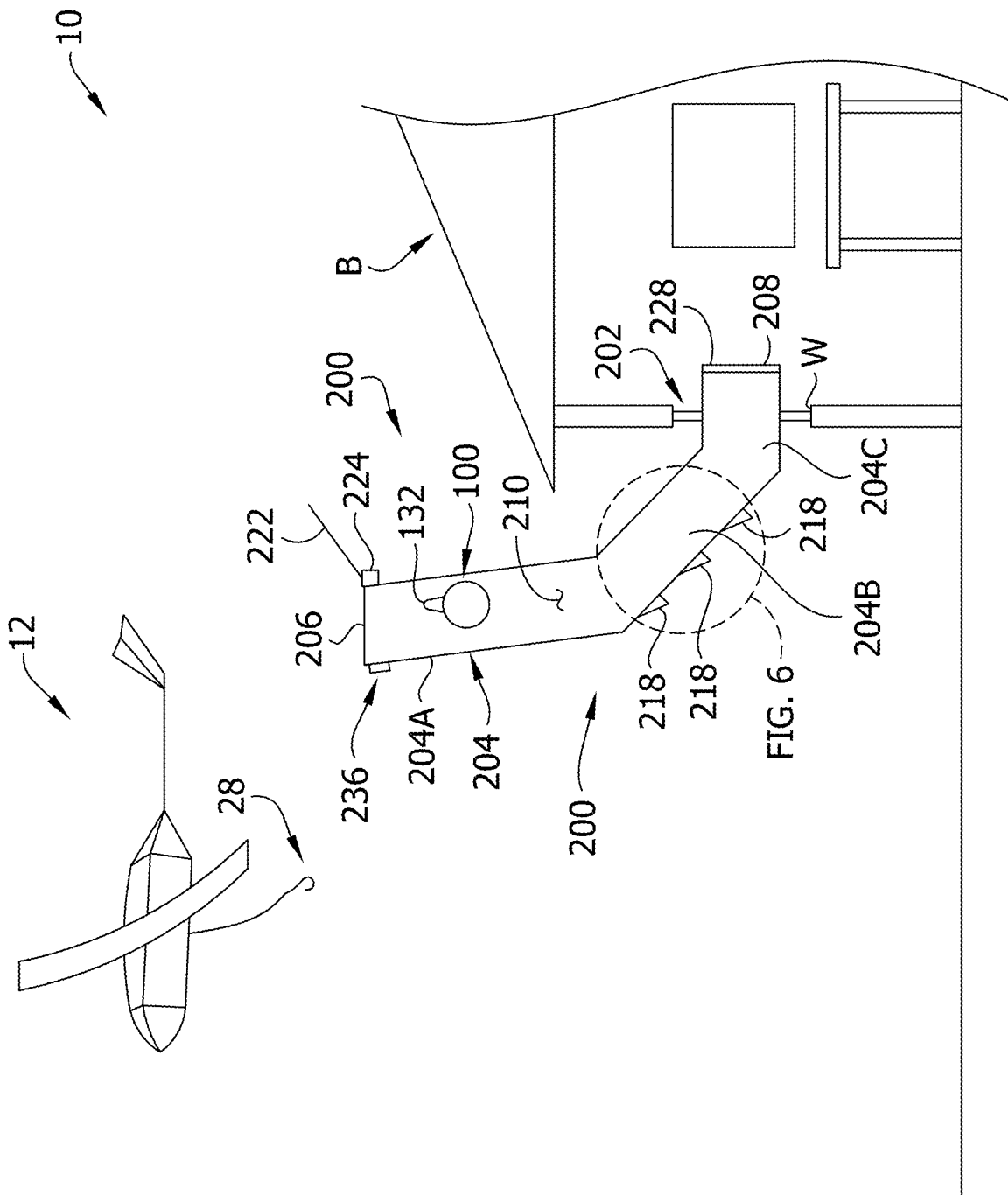
FIG. 5 is an illustration of a pharmaceutical package delivery system according to one embodiment of the present disclosure.
Figure 10:
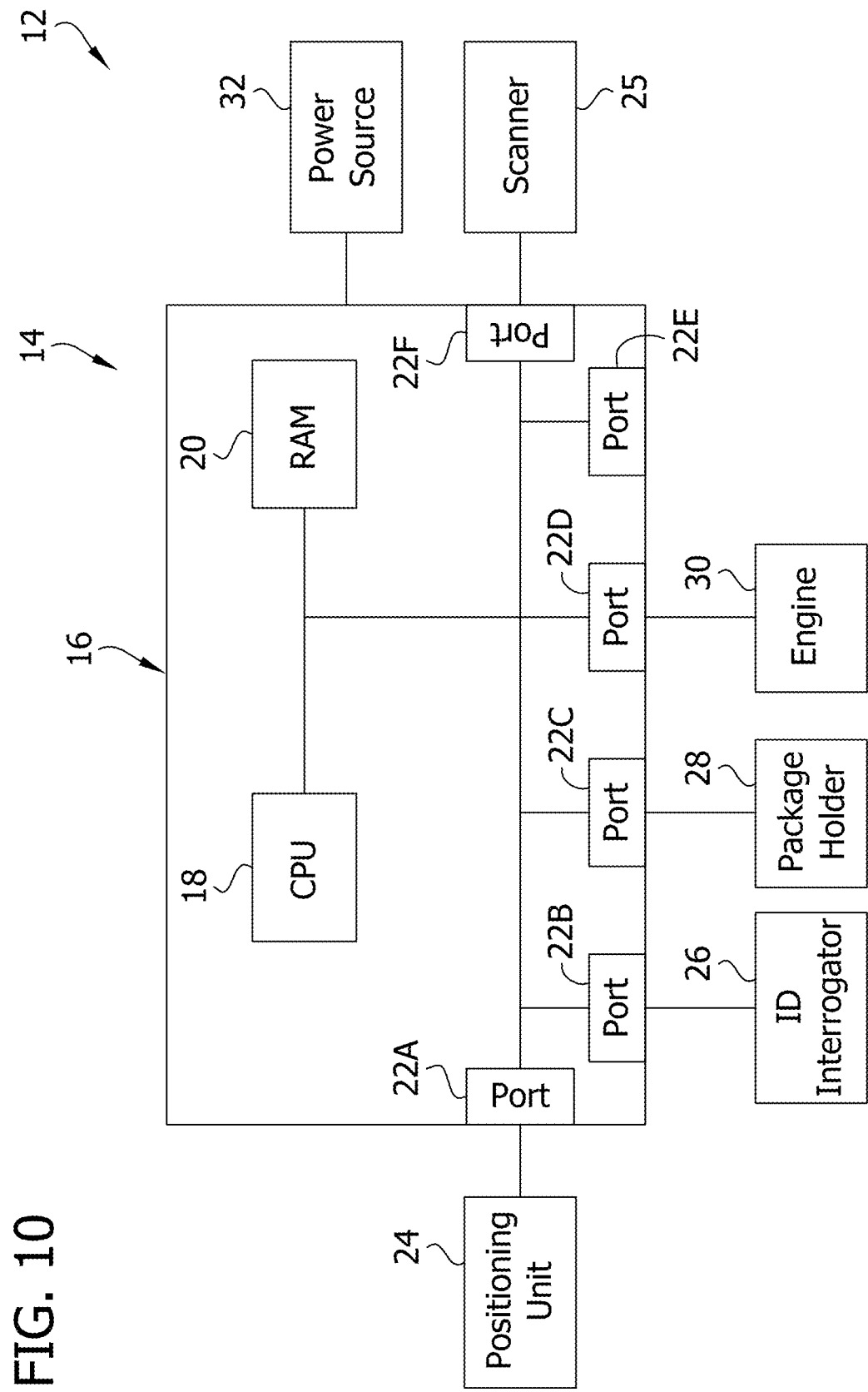
FIG. 10 is a diagram of an exemplary control system for a carrier of a pharmaceutical package delivery system.

Referring to FIGS. 5, 9 and 10, the carrier 12 is a flying vehicle, such as a UAV, a drone, a plane, a helicopter, etc. In the illustrated embodiments, the carrier 12 is a UAV. Specifically, the UAV 12 is a fixed wing (e.g., airplane type) UAV, although other types of UAVs (e.g., single rotor (i.e., helicopter type), multi-rotor (i.e., helicopter type), fixed-wing hybrid) are within the scope of the present disclosure. The UAV 12 is generally autonomous and can deliver pharmaceutical packages 100 with little to no user control or input. Accordingly, the UAV 12 is a smart UAV that can avoid obstacles, fly to coordinates and delivery the pharmaceutical package 100 on its own.

Referring to FIG. 10, the UAV 12 has a control system 14 configured to control and operate the UAV. The control system 14 includes a controller 16 having a CPU or processor 18 and RAM or memory 20 (broadly, non-transitory computer-readable storage medium). The controller 16 provides the computing engine that drives the operation of the UAV 12. Broadly, the memory 20 includes (e.g., stores) processor-executable instructions for controlling the operation of the processor 18. The instructions embody one or more functional aspects of the UAV 12, with the processor 18 executing the instructions to perform said one or more functional aspects.

The controller 16 includes a plurality of (broadly, at least one) communication gateways or ports 22A-F for communication with other components of the UAV 12 and other devices, such as a catcher 200 described in more detail below. The ports 22A-F are communicatively coupled to the processor 18 and/or memory 20. Each port 22A-F may be used to communicatively couple the controller 16 to another device of the UAV. For example, the illustrated UAV 12 includes a positioning unit 24, a scanner 25 (e.g., an imagining device, camera, etc.), an ID interrogator 26, a package holder 28 and at least one engine 30, each connected to the controller 16 via a port 22A-F. Various types of communication ports 22A-F are contemplated. The ports 22A-F may include wired and/or wireless ports. For example, the communication ports 22A-F can include an infrared (IR) port, a hardwire port, a Bluetooth port, a cellular port (e.g., cellular communications broadband network) and/or a Wi-Fi port, and it is understood that various other types of communication ports (e.g., near field communication) can be used without departing from the scope of the present disclosure.

The positioning unit 24 is configured to provide positional information (e.g., coordinates) of the UAV 12 to the controller 16. For example, the positioning unit 24 may be a GPS unit that provides the GPS coordinates for the UAV 12. The scanner 25 is configured to read a machine-readable marking to obtain information from said marking, as described in more detail below. The ID interrogator 26 is configured to obtain information from the pharmaceutical package 100. Such information can include, but is not limited to, an identity (e.g., serial number) of the pharmaceutical package 100, prescription information, patient information, delivery destination information, delivery receptacle information, or combinations thereof. In one embodiment, the ID interrogator 26 is a radio frequency identification (RFID) scanner configured to communicate with an RFID tag of the pharmaceutical package 100, as described below. The package holder 28 is configured to releasably secure the pharmaceutical package 100 to the UAV 12. The package holder 28 is configured to release the pharmaceutical package 100 when the UAV 12 reaches the delivery destination (e.g., delivery coordinates, gps coordinates, satellite navigation coordinates), to deliver the package. In the illustrated embodiment, the package holder 28 is a hook that can be selectively opened to release the pharmaceutical package 100. Other types of package holders 28 are within the scope of the present disclosure. For example, the package holder can be a compartment or bay that can be selectively opened (such as by a swinging door) to release the pharmaceutical package 100, gripper fingers, or a claw. The UAV 12 can carry one or more packages 100 (see FIGS. 5 and 9) at a time. Accordingly, the UAV 12 can make multiple deliveries during a single flight. In this embodiment, the UAV 12 may include multiple package holders 28 (e.g., hooks, claws, etc.), one for each package 100 carried by the UAV (FIG. 5). In other embodiments, the UAV 12 may include a single package holder 28 (e.g., compartment, bay, etc.) that is configured to release the multiple packages 100 individually or together. The UAV 12 also has one or more engines 30 (e.g., electric motors operatively coupled to propellers) to drive the movement of the UAV. The UAV 12 also includes a power source 32, such as a battery, to power the UAV and associated components.

The multiple package holders 28 can be individually controlled to release a single designated package at a delivery location while retaining the other packages on their respective package holders 28. In an example embodiment, the package holders include an elongate, flexible cable extending from the bottom of the UAV 12 with a selectively openable loop of gripping mechanism at the free end of the cable. In the example embodiment of multiple packages being delivered by the UAV 12, the cables can have varying lengths with the first package to be delivered being on the longest cable and the last package being delivered being on the shortest cable. Thus, the packages being delivered would not bang against each other during flight or interfere with each other during delivery, e.g., a drop. The lowest package would be delivered before the next lowest package is delivered. The UAV 12 can control the opening of the gripping mechanism.

Figure 2:
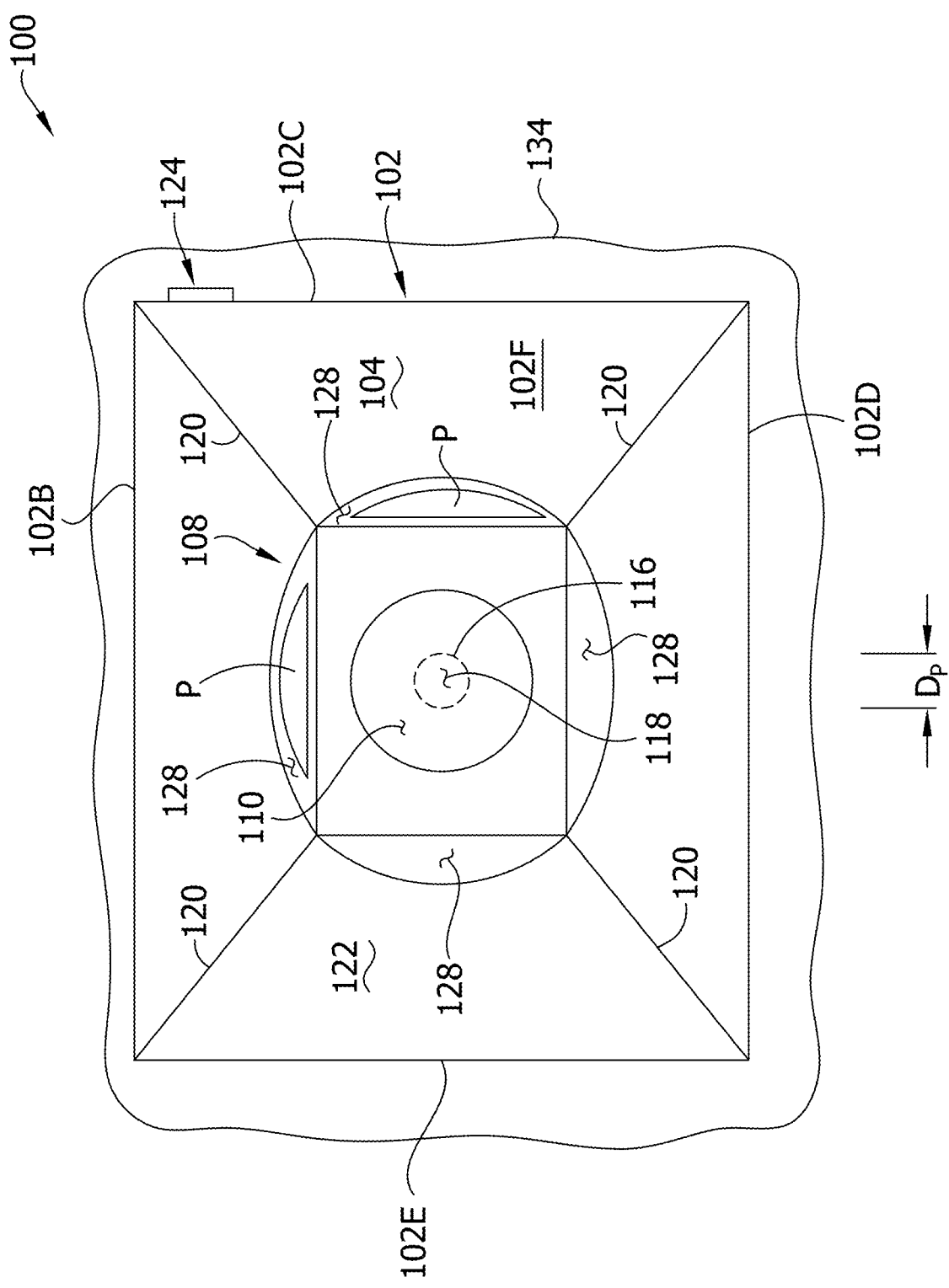
FIG. 2 is a cross-section of the pharmaceutical package taken through line 2-2 of FIG. 1.

Referring to FIGS. 1 and 2, one embodiment of the pharmaceutical package 100 is generally shown. The pharmaceutical package 100 is configured to carry a pharmaceutical container C. Although the pharmaceutical package 100 is described herein as being delivered by a UAV 12, it is understood the pharmaceutical package is suitable for use with generally any type of carrier, such as land based carriers (e.g., trucks). The pharmaceutical package 100 includes an outer or first housing 102 that defines an interior 104. The first housing 102 defines a first housing opening 112 sized and shaped to allow the pharmaceutical container C to pass into the interior 104. In the illustrated embodiment, the first housing 102 has a generally polyhedron shape and is formed of walls or panels 102A-F joined together. The first housing 102 can have other shapes. For example, the first housing 102 can have an aerodynamic shape, such as a spherical shape, an egg shape, a cloud shape, a dodecahedron shape, an ovoid shape, or an airfoil shape. An aerodynamic shape may be particularly desirable if the pharmaceutical package 100 is going to be carried outside of the UAV 12, as shown in FIGS. 5 and 9. For example, FIG. 5 illustrates a pharmaceutical package, generally designated at 100', having a spherical shape and FIG. 9 illustrates a pharmaceutical package, generally designated at 100", having an ovoid shape. Besides the shapes of the first housings 102, pharmaceutical packages 100' and 100" are generally the same as pharmaceutical package 100. The pharmaceutical package 100 may also include a shipping label sleeve or pocket 106 configured to receive a shipping label. The shipping label pocket 106 may include a transparent cover to allow the details of the shipping label to be viewed when the shipping label is in the shipping label pocket. In the illustrated embodiment, the first housing 102 is shown as being generally transparent to show interior details of the pharmaceutical package. The first housing 102 may be made of a generally transparent, translucent, and/or opaque material.

The pharmaceutical package 100 includes an inner or second housing 108 in the interior 104 of the first housing 102. The second housing 108 defines a compartment 110 that is sized and shaped to receive and carry the pharmaceutical container C. The second housing 108 can have any suitable shape. In the illustrated embodiment, the second housing 108 has a generally cylindrical shape, although the second housing can have a polyhedron shape, a spherical shape, an ovoid shape, etc. The second housing 108 defines a second housing opening 114 in communication with the compartment 110. The second housing opening 114 is sized and shaped to allow the pharmaceutical container C to pass into the compartment 110.

The pharmaceutical package 100 includes a plurality (broadly, one or more) of supports 120 secured to and extending between the first housing 102 and the second housing 108. The supports 120 secure and hold the second housing 108 in the interior 104 of the first housing 102. In the illustrated embodiment, the supports 120 are panels or sheets that extend from corners between adjacent walls 102B-E to the second housing 108. Other configurations and arrangements of the supports 120 are within the scope of the present disclosure. For example, the supports 120 can extend from other locations on the first housing 102, such as the corners of the polyhedron or surfaces of the walls 102A-F. The supports 120 can be ribs, webs, and/or strands that extend between the first and second housings 102, 108. Moreover, one or both of the first and second housings 102, 108 can include reinforcement (not shown), such as an additional layer of material, where the supports 120 connect to the respective first and second housings to strengthen the connection. The first housing 102, the second housing 108 and the supports 120 can be formed from a lightweight plastic (e.g., a thin film) such as flexible polyvinyl chloride (PVC), or any other suitable material. The supports 120 may be generally rigid or flexible. In general, the components of the pharmaceutical package 100 are desirably made of lightweight components to reduce the overall weight of the package, as the amount of weight that can be carried by the UAV 12 is limited.

The pharmaceutical package 100 includes a gas or inflatable chamber 122 between the first and second housings 102, 108. The gas chamber 122 is configured to hold a fluid, such as air (e.g., gas, water (i.e., a liquid), refrigerant), to inflate the gas chamber (e.g., an inflated state). Desirably, the gas chamber 122 is bounded by at least one of the first or second housings 102, 108. In the illustrated embodiment, the gas chamber 122 is bounded by the first housing 102 and the second housing 108. As a result, in the illustrated embodiment, the gas chamber 122 is coextensive with a portion of the interior 104 of the first housing 102. Other configurations and arrangements are within the scope of the present disclosure. For example, the gas chamber 122 can be defined by a separate component, such as a bag or inflatable insert (not shown), disposed between the first and second housings 102, 108. The pharmaceutical package 100 may include a selectively operable valve 124 configured to permit the gas chamber to be selectively filled and emptied with the fluid (e.g., inflated or deflated). In the illustrated embodiment, the valve 124 is positioned on and connected to the first housing 102. The valve 124 may allow the gas chamber 122 to be manually or automatically inflated and deflated.

The pharmaceutical package 100 also includes a passage 116 configured to permit the pharmaceutical container C to be inserted into and retrieved from the compartment 110. The passage 116 extends from the first housing 102 to the second housing 108. The passage 116 defines a passageway 118 extending between the first housing opening 112 and the second housing opening 114. The passageway 118 allows the pharmaceutical container C to be positioned in the compartment 110 of the second housing 108 by moving the pharmaceutical container through the first housing opening 112, the passageway and the second housing opening 114. As shown in FIG. 1, the passage 116 is connected to the first housing 102 and generally surrounds (e.g., circumferentially surrounds) the first housing opening 112. Similarly, the passage 116 is connected to the second housing 108 and generally surrounds (e.g., circumferentially surrounds) the second housing opening 114. Desirably, the passage 116 is formed of a fluid impervious material. For example, the passage 116 can be formed from a lightweight plastic (e.g., a thin film) such as flexible PVC, or any other suitable material. In the illustrated embodiment, the passage 116 is shown as being generally transparent to show interior details of the pharmaceutical package.

The pharmaceutical container C can be secured in the compartment 110 in different ways. The pharmaceutical package 100 can include a door 126 to secure the pharmaceutical container C in the compartment 110. In the illustrated embodiment, the door 126 is connected to the first housing 102 and closes or covers the first housing opening 112 (FIG. 1). Alternatively, the door 126 can close or cover the second housing opening 114. The door 126 can be releasable secured in a closed position by a closure (not shown), such as an adhesive, a zipper, magnets, interlocking components, etc. or any other suitable device. In another embodiment, the door 126 may be permanently secured in a closed position after the pharmaceutical container C is placed in the compartment 110 such that the only way to open the door is to tear (e.g., damage, deform, break, etc.) the door or other portion of the pharmaceutical package 100. In such an embodiment, the door 126 may be heat sealed to the first housing 102 in the closed position. Whether the door 126 is permanently or releasably secured in the closed position may depend on if the pharmaceutical package 100 is configured for one-time use or multiple uses (e.g., reusable), respectively, as described below.

Alternatively, or in addition, the passage 116 of the pharmaceutical package 110 can be used to secure the pharmaceutical container C in the compartment 110. The passage 116 can be configured to constrict to substantially close the passageway 118 to prevent the pharmaceutical container from moving through the passageway and out of the pharmaceutical package when the gas chamber 122 is filled with the fluid. In such an embodiment, the passage 116 may define or border a portion of the gas chamber 122. When the gas chamber 122 is filled with fluid, the passage 116 bulges inwardly and substantially closes the passageway 118, as shown in FIG. 2. Specifically, a crosswise dimension $D_P$ (e.g., diameter, width, etc.) of the passageway 118 is reduced to be less than the size of the pharmaceutical container C. In one embodiment, the crosswise dimension $D_P$ may be reduced to zero. The pharmaceutical container may be passed through the passageway 118 before or after inflating the chamber 112. After the chamber is inflated, the passage 116 may be sufficiently compliant to permit the container C to be shoved through the passage notwithstanding the dimension $D_P$ being less than the width of the container. It is understood that when the fluid is not reducing the passage 116, the crosswise dimension $D_P$ is large enough to permit the pharmaceutical container C to pass therethrough.

In this embodiment, the passage 116 may comprise an excess amount of material to allow the passage to be constricted by the gas chamber 122. This allows the passage 116 to bulge inwardly to reduce the dimension $D_P$ of the passageway 118 relative to the dimensions (e.g., diameters, widths, etc.) of the first and second housing openings 112, 114 when the gas chamber is in the inflated state. For example, a passage wall of the passage 116 can have a length extending between the first and second housing openings 112, 114 that is greater than a passageway length. The length of the passageway 118 correspond to a distance from the first housing opening to the second housing opening. In another embodiment, the a passage wall of the passage 116 can have a crosswise dimension $D_P$ that is greater than the width or diameter of the first and/or second housing openings 112, 114. As mentioned above, the passage 116 is made out of a flexible material, such as flexible PVC plastic. As a result, the excess flexible material of the passage 116 is pushed inward by the gas chamber 122 when the gas chamber is inflated. When the gas chamber 122 is inflated, the passage 116 may have a generally hourglass shape (wider at its ends and narrower in the middle). Other configurations are within the scope of the present disclosure.

The pharmaceutical package 100 may include at least one refrigeration compartment 128 configured to hold a refrigerant. The refrigerant may be required if the pharmaceutical container C carried by the pharmaceutical package requires refrigeration. In the illustrated embodiment, four refrigeration compartments 128 are provided, and each refrigeration compartment comprises a refrigeration pocket on the second housing 108 configured to receive and hold a removable refrigeration packet P (FIGS. 1 and 2). Each refrigeration pocket 128 has an open end in communication with the passageway 118 to allow a refrigeration packet P to be inserted into the pocket. In the illustrated embodiment, refrigeration packets P are shown in two of the pockets 128. Other numbers and configurations of refrigeration compartments can be used without departing from the scope of the present disclosure.

Still referring to FIG. 1, the pharmaceutical package 100 may also include an identification tag 130 that is read by the UAV 12, specifically, the ID interrogator 26. In an alternative embodiment, the identification tag 130 may be part of the pharmaceutical container C. The identification tag 130 includes at least an identity (e.g., serial number, code, name, sequence) of the pharmaceutical package 100—i.e., a unique identity of the pharmaceutical package (and/or pharmaceutical container C). The identification tag 130 may also include prescription information (e.g., the type of pharmaceutical, amount of the pharmaceutical, etc.), patient information (e.g., name of the patient, age, etc.), delivery destination information (e.g., the delivery location, delivery coordinates, address, etc.), delivery receptacle information (e.g., an identity of the catcher 200) or any combination thereof. In one embodiment, the identification tag 130 includes an RFID tag. The identification tag 130 is configured to provide information to the UAV 12 when read by the UAV. The identification tag 130 may provide the UAV 12 with one or more of the identity, the prescription information, the patient information, the delivery destination information, the delivery receptacle information, or any combination thereof. The information contained by the identification tag 130 may be encrypted to protect the information from unauthorized discovery. The UAV 12 may use the information collected from the identification tag 130 when delivering the pharmaceutical package 100. For example, the UAV 12 may obtain the delivery coordinates from the identification tag 130. The identification tag 130 can be located at any suitable position on the pharmaceutical package 100.

The pharmaceutical package 100 may also include a carrier connector 132 (FIGS. 5 and 9) configured to be coupled to the carrier 12 in order to couple the pharmaceutical package to the carrier. The carrier connector 132 is configured to be coupled to the package holder 28 of the carrier 12. In the illustrated embodiments, the carrier connector 132 comprises a loop configured to be coupled to the hook 28 of the UAV 12, although other configurations are within the scope of the present disclosure. It is understood that the type of carrier connector 132 on the pharmaceutical package 100 will depend on the type of package holder 28 of the UAV 12, and in some embodiments, the carrier connector 132 may not be needed to couple the pharmaceutical package 100 to the package holder 28, such as when the package holder is a compartment in the UAV.

Referring to FIG. 2, in some embodiments, the pharmaceutical package 100 may include a protective cover 134 over the first housing 102. The protective cover 134 is may be made of a thicker material than that of the first housing 102, such as a heavy duty flexible PVC or other suitable material. In one embodiment, the protective cover 134 is heat sealed around the first housing 102 after the pharmaceutical container C is placed in the compartment 110. In one embodiment, the protective cover 134 may be formed from a thermal-reflective and/or insulating material to help insulate the compartment 110 when the pharmaceutical package 100 includes a refrigerant or refrigeration pack P. Alternatively, or in addition, the first housing 102 and/or second housing 108 can be formed from thermal-reflective material as well.

In use, the pharmaceutical container C can be placed into the compartment 110 by passing the container through the first housing opening 112, the passageway 118 and the second housing opening 114. The gas chamber 122 can be inflated before or after installing the container C in the compartment 110. In one embodiment, the second housing 108 may collapse around and conform to the shape of pharmaceutical container C when the gas chamber 122 is filled. This is similar to how the passage 116 may collapse when the gas chamber 122 is inflated. If any refrigeration packs P are needed, they may be placed into the refrigeration pockets 128 at generally the same time as the pharmaceutical container C, desirably before inflating the chamber 122. After the gas chamber 122 is inflated, the door 126 is closed (if included). A shipping label (not shown) is inserted into the shipping label pocket 106 and the pharmaceutical package 100 is ready to be loaded onto the carrier 12. The programming of (e.g., loading of information onto) the identification tag 130 can happen at any time, desirably before the pharmaceutical package 100 is loaded onto the carrier 12.

The gas chamber 122 of the pharmaceutical package 100 provides several benefits. First, the gas chamber 122 provides thermal insulation for the compartment 110. In addition, the gas chamber 122 acts as a shock absorber to dampen impact of the pharmaceutical container C when the pharmaceutical package 100 is dropped by the UAV 12 and impacts a surface, such as a surface of the catcher 200. In one embodiment, the pharmaceutical package 100 may include a weight (not shown), such as a piece of metal or similar heavy material, disposed on the first housing 102 or other suitable location to promote the pharmaceutical package falling in a certain orientation. The weight alters the center of gravity of the pharmaceutical package 100, with the side of the pharmaceutical package closest to the center of gravity generally being oriented downward (due to the location of the center of gravity) when the package is dropped and failing. Desirably, the weight is positioned to shift the center of gravity between the weight and the compartment 110 (e.g., pharmaceutical container C). Moreover, the second housing 102 and corresponding compartment 110 can be offset in the interior 104, away from the side of the pharmaceutical package 100 that will orient downward when the package falls, to provide a greater degree of shock absorbance for the pharmaceutical container C.

The pharmaceutical package 100 can be configured for a single-time use or for multiple uses. For example, in a single use configuration, the pharmaceutical package 100 may not include the valve 124. Instead, gas may be introduced into the gas chamber 122 as the pharmaceutical package 100 is constructed. In addition, after installing the container C, the door 126 can be permanently secured in the closed position for a single use configuration. In the single use configuration, a person may have to cut or tear the door 126 and/or the first housing 102 to retrieve the pharmaceutical container C from the compartment 110 (and may need to deflate the gas chamber 122). In the multi-use configuration, the pharmaceutical package 100 desirably includes the valve 124 and the door is re-closable. This will allow a person to open the door and deflate the gas chamber 122 without having to damage the pharmaceutical package 100. The pharmaceutical package 100 may also be foldable into itself to be mailed back to the shipper of the pharmaceutical container C to be re-used. Alternatively, a return sleeve (not shown) can be provided to return the pharmaceutical package 100 to the shipper to be reused (e.g., a return sleeve can be included in the compartment 110 with the pharmaceutical container C).

Figure 3:
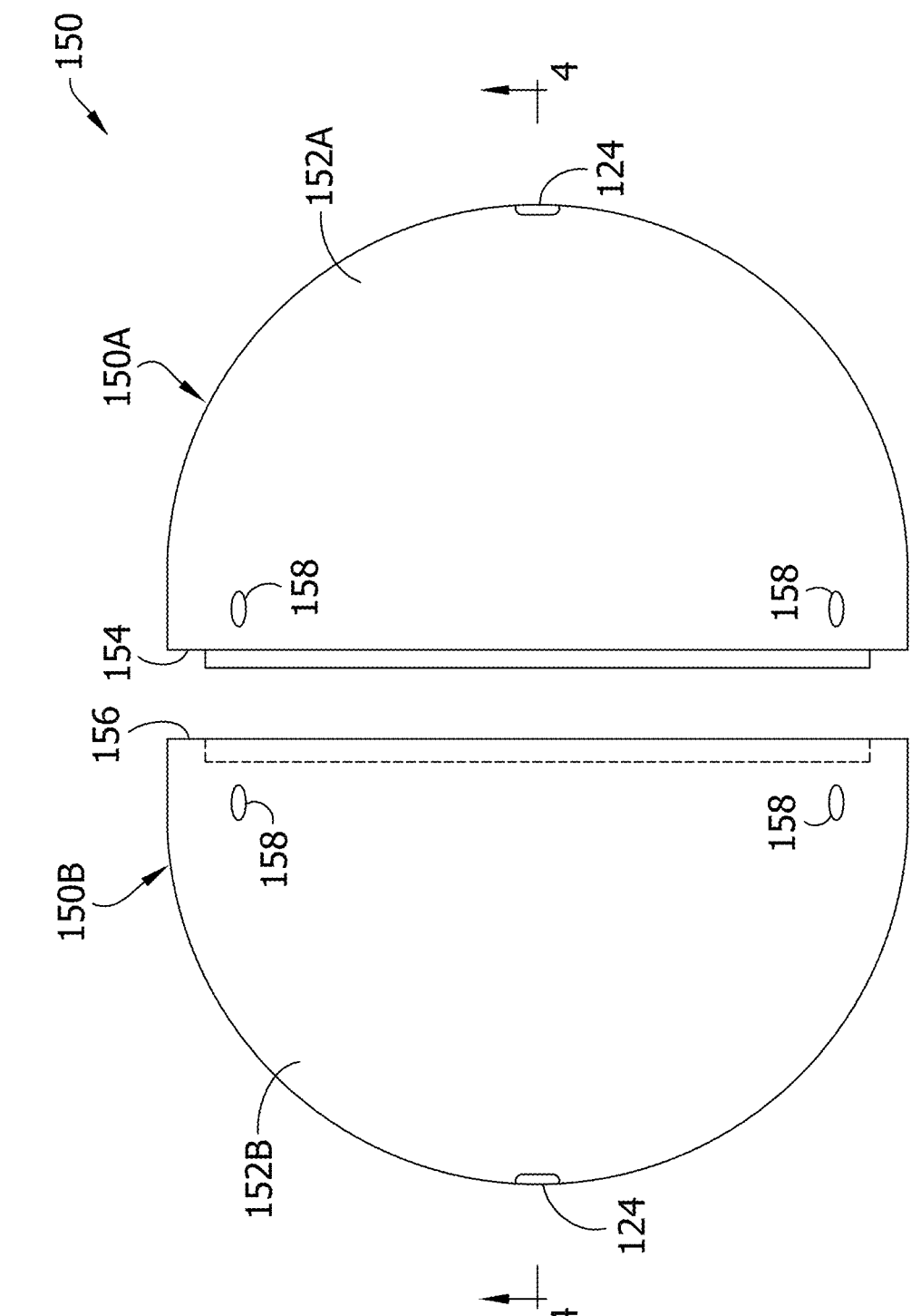
FIG. 3 is a front view of a pharmaceutical package according to another embodiment of the present disclosure.
Figure 4:
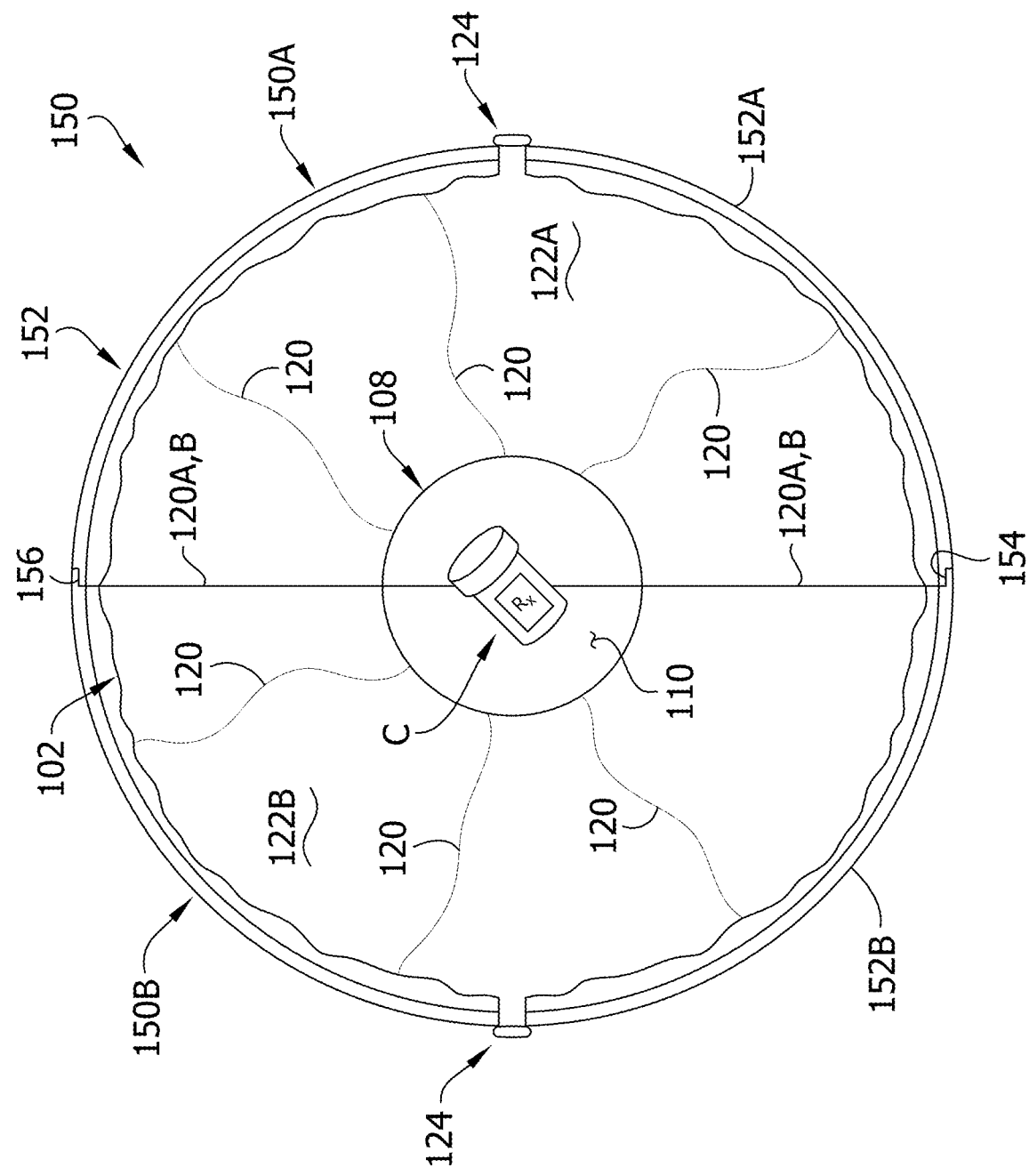
FIG. 4 is a cross-section of the pharmaceutical package generally taken through line 4-4 of FIG. 3.

Referring to FIGS. 3 and 4, another embodiment of the pharmaceutical package is generally indicated at 150. Pharmaceutical package 150 is similar to pharmaceutical package 100 and for ease of comprehension, where pharmaceutical package 150 includes similar or analogous elements to that of pharmaceutical package 100, identical reference numbers are used. Accordingly, it is understood that the description above related to pharmaceutical package 100 also applies to pharmaceutical package 150. One difference between pharmaceutical package 150 and 100 is that pharmaceutical package 150 includes two pieces 150A, 150B that are secured together. In the illustrated embodiment, each piece 150A, 150B is a portion (e.g., half) of a sphere, such that the pharmaceutical package 150 forms a sphere when the two pieces are joined together. Because the pharmaceutical package 150 is formed of separate pieces 150A, 150B, each piece generally includes a portion of the first housing 102, a portion of the second housing 108, a portion of the gas chamber 122 and some supports 120, as shown in FIG. 4. Specifically, each piece 150A, 150B includes its own gas chamber portion 122A, 122B defined by a portion of the first housing 102, second housing 104 and the supports 120A, 120B which extend between the peripheral edges of the portions of the first housing 102 and the portions of the second housing 108. As is apparent, the pharmaceutical package 150 does not include a passage (and corresponding first and second housing openings) because the chamber 110 is openable and can receive the pharmaceutical container C when the pieces 150A, 150B are not joined together. In other embodiments, the pieces 150A, 150B may be hinged or otherwise partially coupled together.

The pharmaceutical package 150 also includes a rigid outer shell 152 surrounding the first housing 102. Each piece 150A, 150B includes respective first and second shell portions 152A, 152B of the outer shell 152. The first and second shell portions 152A, 152B are configured to be secured together to connect the pieces 150A, 150B. In the illustrated embodiment, the first shell portion 152A includes a circumferential notch or channel 154 configured to receive a circumferential lip or projection 156 to facilitate the connection of the pieces 150A, 150B. In the illustrated embodiment, the first and second shell portions 152A, 152B define fastener openings 158 that receive fasteners (not shown) to connect the pieces 150A, 150B together. Other ways of connecting the pieces 150A, 150B together are within the scope of the present disclosure. For example, the pieces 150A, 150B can be taped or otherwise adhered together. A valve 124 is mounted on each portion 152A, 152B of the outer shell 152 to inflate and deflate the gas chamber portions 122A, 122B, respectively. In addition, in this embodiment, the shipping label pocket 106 is preferably mounted on the exterior of the shell 152. The shell 152 may be formed out of any suitable material such as a rigid or flexible plastic.

In use, the pharmaceutical container C is placed into a portion of the compartment 110 when the pieces 150A, 150B are separate. The gas chamber portions 122A, 122B may be partially or fully inflated at this point. If any refrigeration packs P are needed, they are placed into the refrigeration pockets 128 at generally the same time as the pharmaceutical container C. The pieces 150A, 150B are then joined together and then the gas chamber portions 122A, 122B may be further inflated via the valves 124, as shown in FIG. 4. This traps the pharmaceutical container in the compartment 110. In one embodiment, the second housing 108 may collapse around and conform to the shape of pharmaceutical container C when the gas chamber 122 is filled. A shipping label (not shown) is inserted into the shipping label pocket 106 and the pharmaceutical package 100 is ready to be loaded onto the carrier 12. The programming of (e.g., loading of information onto) the identification tag 130 can happen any time, desirably before the pharmaceutical package 100 is loaded onto the carrier 12. To open the pharmaceutical package 150 and retrieve the pharmaceutical container C, the pieces 150A, 150B are separated such as by releasing the fasteners or cutting the tape. The valves 124 can also be used to deflate the gas chamber portions 122A, 122B.

Figure 6:
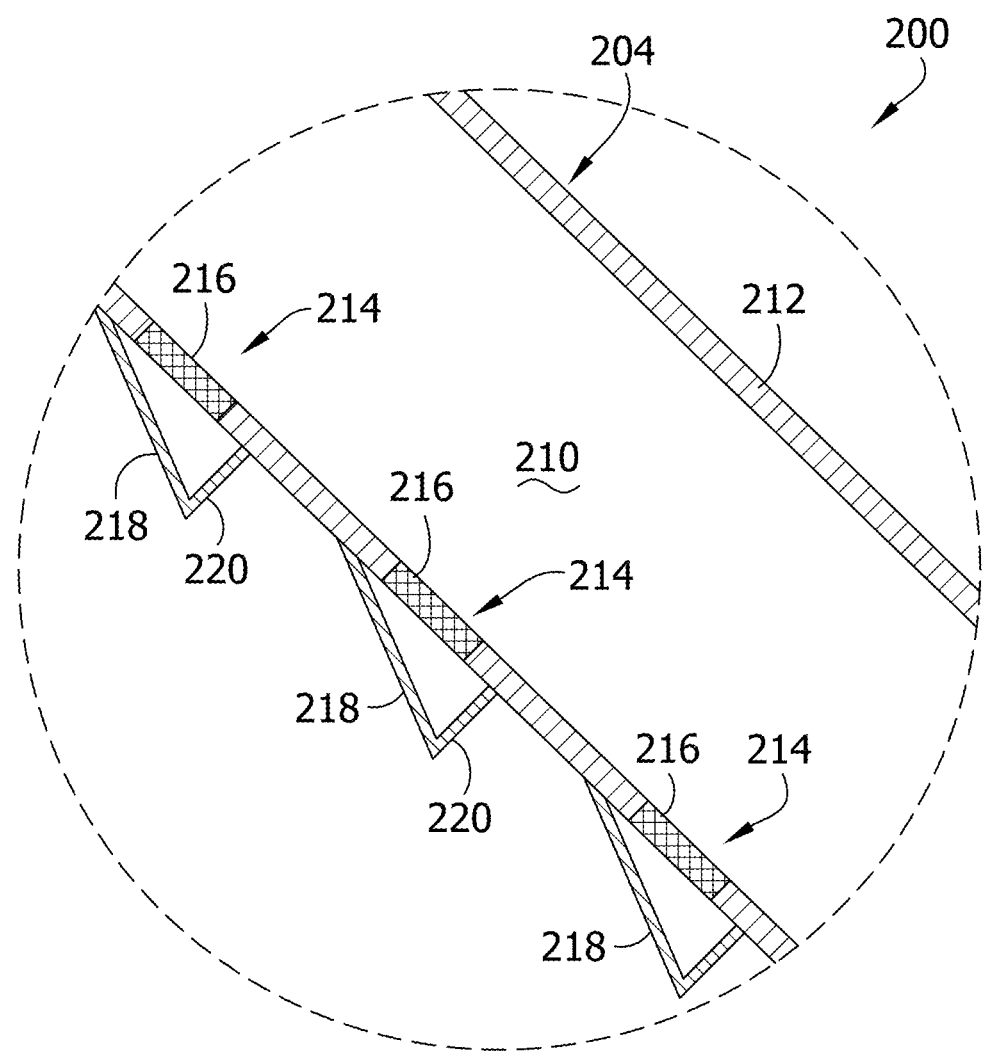
FIG. 6 is an enlarged, fragmentary view of a catcher of the pharmaceutical package delivery system of FIG. 5.
Figure 7:
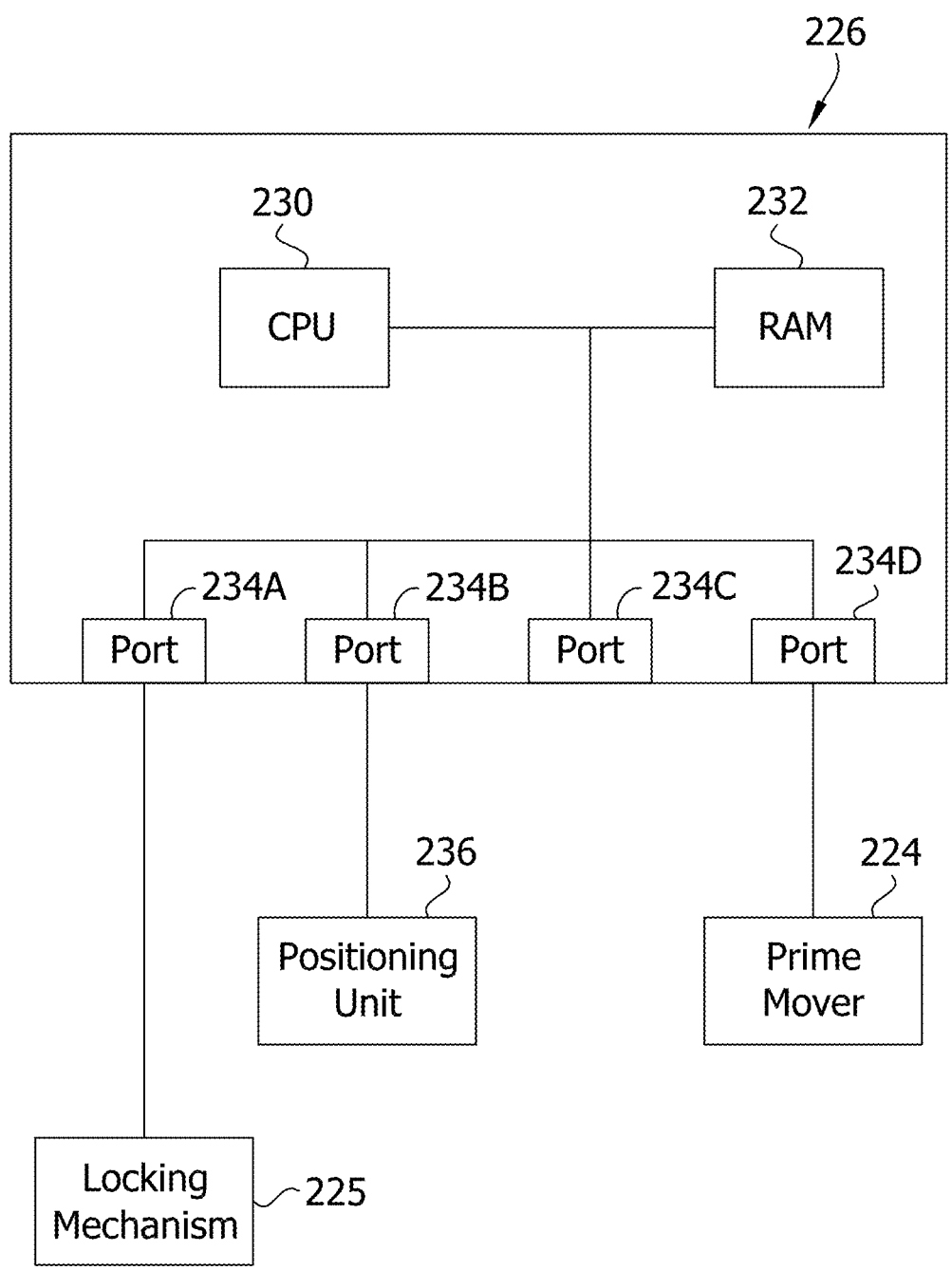
FIG. 7 is a diagram of an exemplary controller for a catcher of a pharmaceutical package delivery system.

Referring to FIGS. 5-7, one embodiment of the catcher is generally indicated at 200. As shown in FIG. 5, the catcher 200 is configured to catch the pharmaceutical package 100' (broadly, a package) delivered by the UAV 12. Although the catchers, such as catcher 200, described herein are described as being used to catch pharmaceutical packages, such as packages 100, 100', 100", it is understood that the catchers can be used to catch other types of packages. In this embodiment, the catcher 200 is mounted to an enclosure, such as a building B (e.g., a home, an apartment, etc.). The catcher 200 includes an enclosure mount 202 configured to mount to the enclosure B to couple the catcher to the enclosure. In the illustrated embodiment, the enclosure mount 202 is configured to mount to and within a window W of the building B. The catcher 200 also includes a chute 204 coupled to the enclosure mount 202. When the enclosure mount 202 is mounted in the window W of the building, the chute 204 extends through the window to deliver the package 100, 100', 100" to the interior of the enclosure, as will become apparent. The enclosure mount 202 can be adjustable (e.g., have an adjustable height and/or width) in order to conform to a variety of different window W sizes.

The chute 204 extends from an upper end 206 to a lower end 208. The chute 204 defines a passageway 210 extending between the upper and lower ends 206, 208. The passageway 210 is configured to receive the pharmaceutical package 100, 100', 100" when the package is dropped by the UAV 12 into the chute 204. The chute 204 includes a circumferential wall 212 defining the passageway 210. The wall 212 may be a fabric covering supporting by a frame, although other configurations are within the scope of the present disclosure. As shown in FIG. 5, the lower end 208 of the chute 204 is positioned in the enclosure B so that the package 100, 100', 100" is delivered into the enclosure when dropped by the UAV 12. The upper end 206 of the chute 206 is positioned to receive the package 100, 100', 100" when installed on the enclosure B. Desirably, the upper end 206 of the chute 204 is spaced apart from and position above the enclosure B when mounted on the enclosure. In one embodiment, the chute 204 may have an adjustable height to adjust the position of the upper end 206 of the chute. Desirably, the chute 204 has at least one bend defining at least one bend in the passageway 210. This facilitates the spacing of the upper end 206 of the chute 204 from the enclosure. In the illustrated embodiment, the chute 204 has two bends, corresponding to two bends in the passageway. In the illustrated embodiment, the chute 204 has a generally vertical first portion 204A, an inclined second portion 204B and a generally horizontal portion 204C, with the two bends separating the portions. Other configurations are within the scope of the present disclosure.

Desirably, the chute 204 includes at least one opening 214 to permit moisture, such as rain water that enters the passageway 210, to flow out of the passageway before entering the enclosure B. In the illustrated embodiment, each opening 214 is covered with a mesh 216 to to prevent animals (e.g., bugs, insects, etc.) from entering the passageway 210 via the opening, while still allowing the moisture to pass there-though. Each opening 214 is positioned between the upper and lower ends 206, 208 of the chute 204. Desirably, each opening 214 is positioned on a lower side of the inclined second portion 204B, which will naturally direct, via gravity, moisture toward the openings. The chute 204 may also include at least one guard 218 configured to cover an opening 214 to shield the opening from wind, dust and moisture. Each guard 214 has an open lower end 220 to permit the moisture that flows out of the passageway 210 through the opening 214 to fall to the surrounding environment. The guards 214 are connected to the exterior surface of the wall 212. In the illustrated embodiment, the chute 204 includes three openings 214 and corresponding guards 218, although more or fewer openings and guards are within the scope of the present disclosure.

The catcher 200 includes a door 222 (e.g., a first door) configured to move between an open position (FIG. 5) and a closed position (not shown) to open and close the passageway 210. Specifically, the door 222 opens and closes an upper end of the passageway 210. The door 200 is movably coupled to the chute 204 at the upper end 206 thereof. As will be explained in more detail below, the door 222 moves to the open position to allow the chute 205 to receive the package 100, 100', 100". Otherwise, the door 222 is in the closed position. The catcher 200 also includes a prime mover 224 operatively coupled to the door 222 to move the door between the open and closed positions. The prime mover 224 may be a motor (e.g., an electric motor), a servo, a linear actuator, or any other suitable device. As explained in more detail below, the prime mover 224 is selectively activated by a controller 226 to move the door 122 towards the open and closed positions. The chute 204 and/or door 222 may also include a weather strip or gasket to form a seal between the door and chute 204 when the door is in the closed position. A locking mechanism 225 may be included, as described below, to lock the door 222 in the closed position.

Figure 5A:
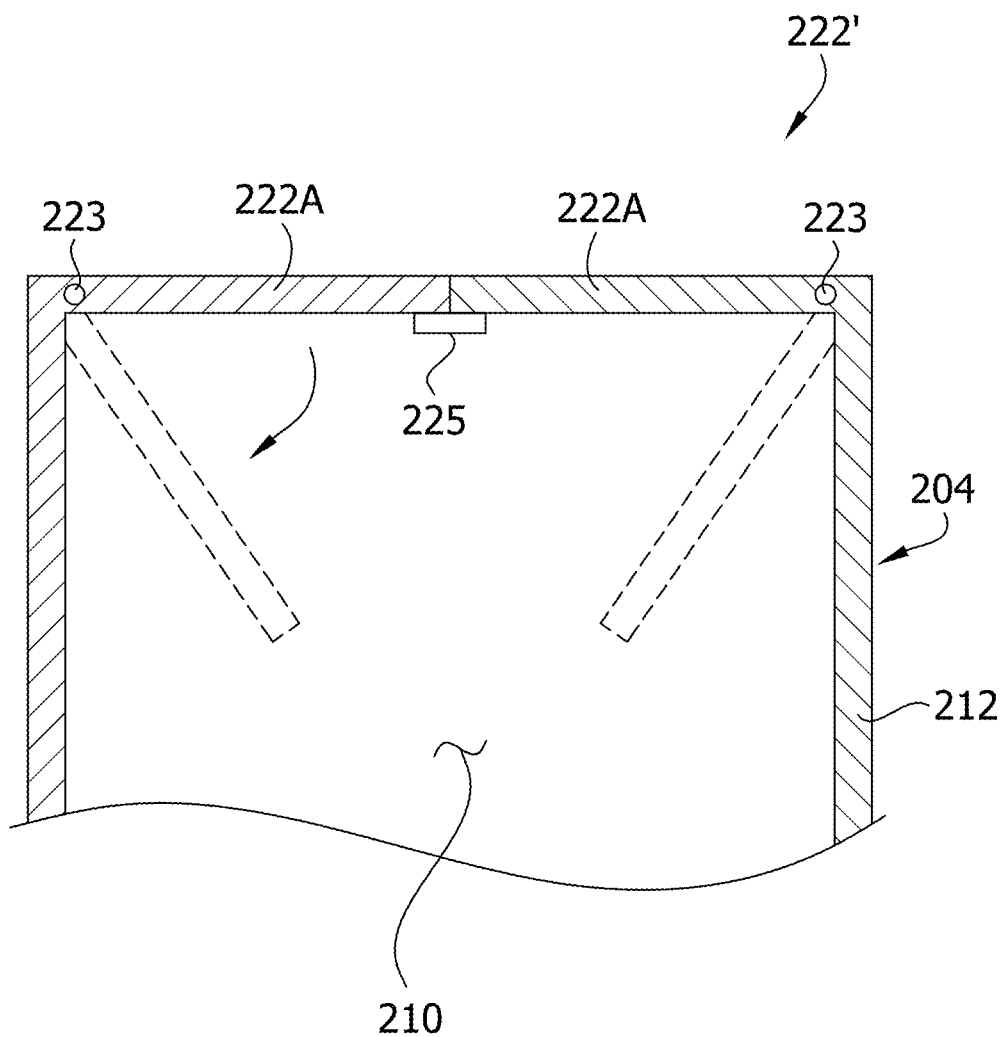
FIG. 5A is an illustration of one embodiment of a door of a catcher of the pharmaceutical package delivery system of FIG. 5.

Referring to FIG. 5A, in another embodiment, the door may comprise a spring loaded trap door, generally indicated by reference numeral 222'. The door 222' includes first and second door portions 222A, 222B. A hinge 223 pivotably connects each door portion 222A, 222B to the chute 204. Each hinge 223 may be spring-loaded to bias each door portion 222A, 222B (e.g., the door 222') toward the closed position (FIG. 5A). The door 222' includes a locking mechanism 225, such as a magnetic lock or strip, to lock the door in the closed position and inhibit the door from unintentionally opening. The controller 126 is communicatively coupled to the locking mechanism 225 to control the locking mechanism to selectively lock and unlock the door 222'. To receive a package 100, 100', 100", the controller 126 unlocks the locking mechanism 225, which allows the door portions 222A, 222B to swing freely to an open position (dashed lines in FIG. 5A) when the door portions are pushed open by the weight of the package. Once the package 100' passes the door 222', the door portions 222A, 222B swing back to the closed position and the controller re-engages the locking mechanism 225.

In one embodiment, the together or individually, the locking mechanism 225 and/or prime mover 224 can be considered a door actuator. Broadly, the door actuator (e.g., locking mechanism 225 and/or prime mover 224) is operatively coupled to the door 222, 222' to control the door (e.g., open or close the door and/or lock or unlock the door) to permit the package 100, 100', 100" to pass the door. Other configurations of the door actuator are within the scope of the present disclsoure.

The catcher 200 may also include another door 228 (e.g., a second door) configured to open and close a lower end of the passageway 210. The second door 228 is positioned in and accessible to the interior of the enclosure B to allow a person to access the package 100, 100', 100" in the chute 204. The door 228 may be insulated to shield the enclosure B from the outside environment. In one embodiment, the catcher 200 may not include the second door 228. In another embodiment, instead of the door 228, the catcher 200 may include a bin (not shown) positioned to receive the package 100, 100', 100" from the lower end of the chute 204.

Referring to FIG. 7, as mentioned above, the catcher 200 includes a controller 226 communicatively coupled to the prime mover 224 and/or locking mechanism 225 to control the prime mover and/or locking mechanism (e.g. the door actuator). The controller 226 includes a CPU or processor 230 and RAM or memory 232 (broadly, non-transitory computer-readable storage medium). The controller 226 provides the computing engine that drives the operation of the catcher 200. Broadly, the memory 232 includes (e.g., stores) processor-executable instructions for controlling the operation of the processor 230. The instructions embody one or more functional aspects of the catcher 200, with the processor 230 executing the instructions to perform said one or more functional aspects.

The controller 226 includes a plurality of (broadly, at least one) communication gateways or ports 234A-D for communication with other components of the catcher 200 and other devices, such as the UAV 12 described in more detail below. The ports 234A-D are communicatively coupled to the processor 230 and/or memory 232. Port 234A communicatively couples the controller 226 to the locking mechanism 225. Port 234B communicatively couples the controller to a positioning unit 236. Port 234C can be used to communicatively couple the controller 226 to the UAV 12 (e.g., port 22E of the UAV's control system 16). Port 234D communicatively couples the controller to the prime mover 224. Various types of communication ports 234A-D are contemplated. For example, the communication ports 234A-D can include an infrared (IR) port, a hardwire port, a Bluetooth port, and/or a Wi-Fi port, and it is understood that various other types of communication ports (e.g., near field communication) can be used without departing from the scope of the present disclosure. The ports 234A-D may include wired and/or wireless ports. The positioning unit 236 is configured to provide positional information (e.g., coordinates) of the catcher 200 to the controller 226. For example, the positioning unit 236 may be a GPS unit that provides the GPS coordinates for the catcher 200. Desirably, the positioning unit 236 is at the upper end of the passageway 210 in order to provide positional information about the upper end of the passage—i.e., where the package 100, 100', 100" enters the chute 204 when the package is dropped by the UAV 12. A power source (not shown), such as a battery or electric power cord for an outlet, powers the controller 226 and associated components.

In operation, the controller 226 is in communication with the UAV 12. For example, wi-fi ports 234C, 22E may establish a communication connection between the controller 226 of the catcher 200 and the UAV 12 when the UAV is within range of the controller (e.g., the controller establishes a local area network). In one embodiment, the UAV 12 may send a signal to the controller 226, instructing the controller 226 to open the door 222 (and/or unlock the locking mechanism 225). In this embodiment, when the controller 226 receives the signal, the controller selectively activates the prime mover 224 (and/or locking mechanism 225) to move the door 222 toward the open position (and/or unlock the locking mechanism). In one embodiment, the controller 226 may send a signal to the UAV 12 when the door 222 is in the open position (and/or the locking mechanism 225 is unlocked) to inform the UAV it can release the package 100, 100', 100". In another embodiment, the controller 226 may send an identity of the catcher 200 to the UAV 12 via the port 234C. The UAV 12 may use the identity received from the catcher 200 to confirm the delivery by matching the identity received from the catcher to the delivery receptacle information received from the identification tag 130 on the package 100, 100', 100". The controller 226 may also activate the prime mover 224 to move the door 222 toward the closed position (and/or the locking mechanism to lock the door). This can be done after the controller 226 receives another signal from the UAV 12, which may be generally indicative of the package 100, 100', 100" having been released, and/or after a certain amount of time has elapsed. In one embodiment, the controller 226 sends the positional information from the positioning unit 236 to the UAV 12 so the UAV drops the package 100, 100', 100" at the correct position, which is generally over the upper end of the passageway 210.

In one embodiment, the controller 226 generally acts as a beacon to attract the UAV 12. The controller 226 may intermittently and/or continuously send a beacon signal to be received by the UAV 12 when the UAV is in range of the beacon signal. The beacon signal can include the identity of the catcher and the positional information of the catcher 200. The UAV 12 can then use this information in order to deliver the package 100, 100', 100". In one embodiment, the controller 226 does not include the positioning unit and, instead, receives the positional information from another source. For example, the controller 226 can be connected to a hand-held device, such as a cell phone, tablet, computer, etc., which can send the positional information to the controller (e.g., the hand-held device provides the positional information via its own positional unit). The controller 226 could connect to the hand-held device, either directly or via an internet connection, using a port 234.

The controller 226 may also communicate the altitude of the catcher 200 (e.g., upper end of the chute 204) to the UAV 12. For example, the catcher 200 can include an altimeter (not shown) communicatively coupled to the controller 226. The altimeter may be positioned at the upper end of the catcher 200 and then sends its altitude to the UAV 12 via the controller 226. In one embodiment, the UAV 12 may use the delivery destination information to get to the general area of the catcher 200 and then use a system of sensors (not shown), such as vision, radar, ultrasonic, etc., to identify the precise location of the catcher 200 in order to drop the package 100, 100', 100". With this embodiment, the catcher 200 may include a machine-readable marking as discussed below.

In other embodiments, the communications between the UAV 12 and the controller 226 may take place over a cellular network and/or the internet. For example, the UAV 12 can communicate with a host or central server (not shown) over a cellular network and the central server can relay the communications between the UAV and the controller via the cellular network or internet. In one embodiment, one or more functions performed by either the controller 226 and the UAV 12 may be performed at the central server. For example, the central server can match the identity of the catcher 200 with the delivery receptacle information received from the identification tag 130 on the package 100, 100', 100", to confirm package delivery and send a corresponding signal to the UAV 12, via the cellular network, that the delivery location is confirmed.

Figure 8:
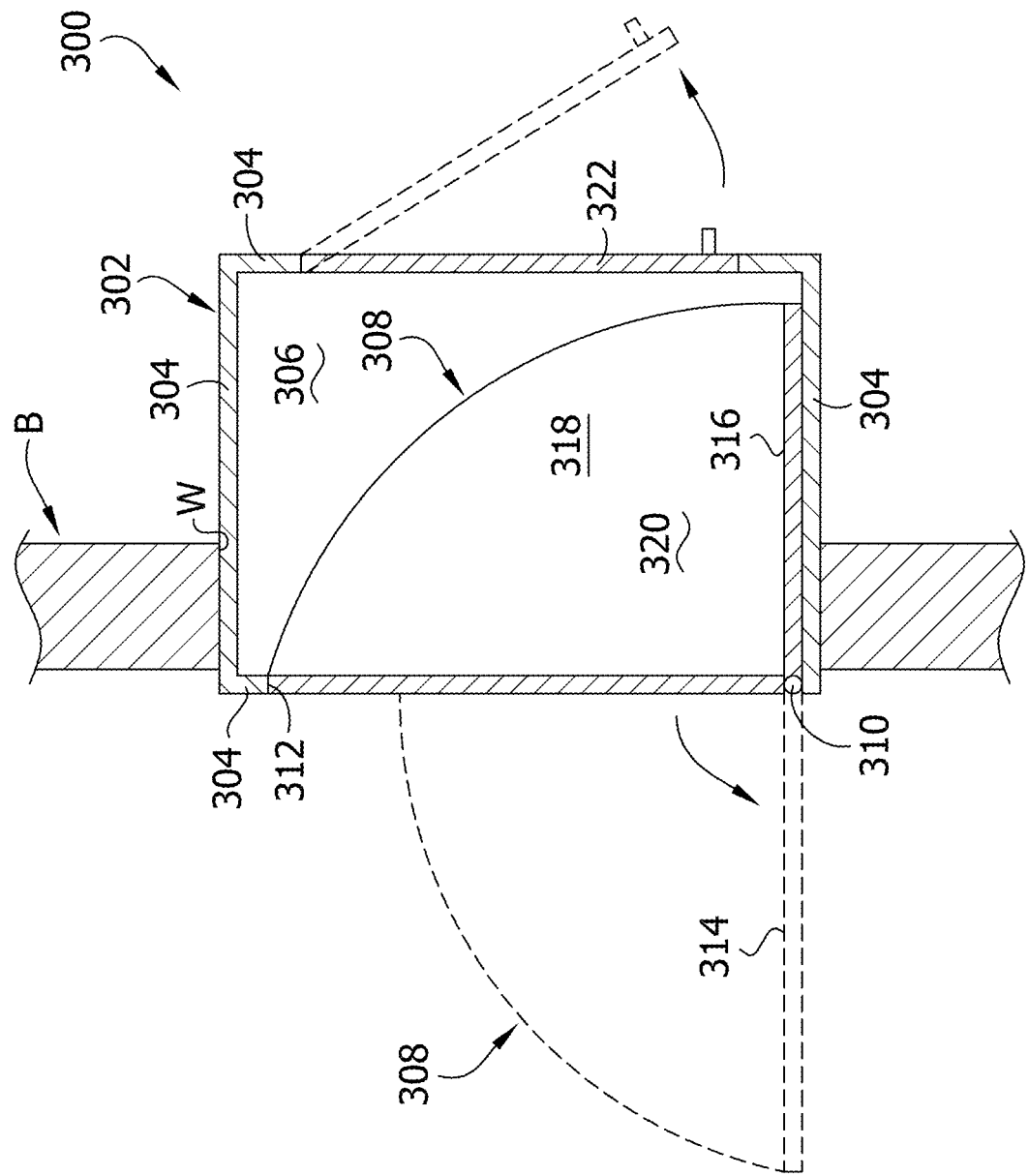
FIG. 8 is an cross-section of another embodiment of a catcher of a pharmaceutical package delivery system.

Referring to FIG. 8, another embodiment of the catcher is generally indicated at 300. As with the other catchers described herein, the catcher 300 is configured to catch a pharmaceutical package 100, 100', 100" (broadly, a package) delivered by the UAV 12. The catcher 300 includes a housing 302 (broadly, enclosure mount) configured to mount to the enclosure B to couple the catcher to the enclosure. In the illustrated embodiment, the housing 302 is configured to mount to and within the window W of the enclosure B. The housing 302 has a generally rectangular box shape (e.g., is a polyhedron) with exterior walls 304 defining an interior 306. The housing 302 is configured such that one exterior wall 304 (the left-most wall in FIG. 8) is generally flush with or slightly exterior of an exterior surface of the enclosure B when the housing is mounted to the window W. This creates a relatively clean appearance for the catcher 300 from a view outside the enclosure B. The housing 302 can be adjustable (e.g., have an adjustable height and/or width) in order to conform to a variety of different window W sizes.

The catcher 300 includes a collector 308. The collector 308 is movably coupled to the housing 302. The collector 308 is movable between a collection position (dashed lines in FIG. 8) and a retracted position (solid lines in FIG. 8). In the collection position, the collector 308 is configured to receive the package 100, 100', 100" when the package is dropped by the UAV 12. In the collection position, at least a portion of the collector 308 is disposed outside the housing 302 and outside the enclosure B, to receive the package. In the retracted position, the collector 308 is generally disposed within the interior 306 of the housing 304. In the illustrated embodiment, the collector 308 is pivotably coupled to the housing 302 via a hinge 310, allowing the collector to pivot between the collection and retracted positions. The collector generally moves through an opening 312 in an exterior wall 304 of the housing 302 to move between the collection and retracted positions. In the retracted position, the collector 308 (e.g., a portion thereof) is generally flush with and defines a portion of an exterior wall 304 of the housing 302. The catcher 300 may include a weather strip or gasket (not shown) to form a seal between the collector 308 and the housing chute 302 when the collector is in the retracted position.

In the illustrated embodiment, the collector 308 includes a first flange 314 and a second flange 316. The first and second flanges 314, 316 extend generally perpendicular to one another and are joined together at respective side edge margins of the first and second flanges. The hinge 310 pivotably coupling the collector 308 to the housing 302 is adjacent the connection between the first and second flanges 314, 316. The collector 308 includes opposite end flanges 318 (only one is shown in FIG. 8) that extend between corresponding end edge margins of the first and second flanges 314, 316. The end flanges 318 have an arcuate edge margin extending between the free side edge margins of the first and second flanges 314, 315. Together the first flange 314, second flange 316 and end flanges 318 define a collector interior 320 sized and shaped to receive the package 100, 100', 100". Desirably, the collector interior 320 has a length and a depth that is greater than or equal to two times a dimension of the package 100, 100', 100". Broadly, the collector 308 may be considered to be a bin the UAV 12 drops the package 100, 100', 100" into. Other configurations and arrangements of the collector 302 are within the scope of the present disclosure.

The catcher 300 may also include an interior door 322 on the housing 302 that permits access to the interior 306 from inside the enclosure B to allow a person to retrieve the package 100, 100', 100" from the catcher. The housing 302, the collector 308 and/or interior door 322 (or portions thereof) may include insulation. The catcher 300 may also include a locking mechanism 225 to lock the collector 308 in the retracted position.

Similar to catcher 200, catcher 300 includes a prime mover 224 operatively coupled to the collector 308 to move the collector between the collection position and the retracted position. The catcher 300 also includes a controller 226, as described above, to control the prime mover 224 (and locking mechanism 225, if included). The controller 226 generally operates in the same manner with catcher 300 as with catcher 200, and thus a detailed description is omitted here with the understanding that the above description relating to the controller applies to catcher 300 as well. The main difference for the controller 226 when used with catcher 300 is that the controller 226 activates the prime mover 224 to move the collector to the collection and retracted positions, instead of moving the door 222 between the open and closed positions. In this embodiment, the catcher 300 may also include a positioning unit 236, as described above.

Referring to FIG. 9, another embodiment of the catcher is generally indicated at 400. As with the other catchers described herein, the catcher 400 is configured to catch a pharmaceutical package 100, 100', 100" (broadly, a package) delivered by the UAV 12. The catcher 400 includes a base 402 configured to support a collector 410. The catcher 400 is positioned near a building or residence the package 100, 100', 100" is being delivered to, such as in the backyard of a residence. The base 402 is configured to be placed on a support surface S, such as the ground, a deck, a street, around a building or residence. The base 402 includes at least two legs 404 to support the collector 410. Desirably, the base 402 is collapsible (e.g., the catcher 400 is collapsible) for easy storage and transportation. In the illustrated embodiment, the base 402 includes four legs 404 arranged in pairs at opposite sides of the base 402. The two legs 404 in each pair are pivotably coupled together by a pin 406. This allows the legs 404 to pivot relative to one another between a stored position (not shown) where the base 402 is relatively flat and a deployed position (FIG. 9) where the ends of the legs are spaced apart from one another. Desirably, the height and/or width of the base at the lower end of the base is adjustable. This allows a person to vary the size of the base 402 to accommodate the size of the package 100, 100', 100" being received. In one embodiment, the legs 404 are telescoping to adjust the height and/or width of the base. In another embodiment, the legs 404 are selectively lockable at different angles (e.g., rotational angles about the pins 406) relative to one another to adjust the height and/or width of the base. Desirably, a length of the base 402 and the width of the base is greater than or equal to two times a dimension of the package 100, 100', 100" to provide a stable foundation for catching the package. In one embodiment, the base 402 has a height (e.g., adjustable height) large enough to position the collector 410 above obstacles that may get in the way of the UAV 12, such as roof tops and/or trees. For example, the base 402 may have a height (e.g., height) of about 20 feet, or about 30 feet, or about 40 feet, or about 50 feet or the base may have an adjustable height between about 20-50 feet, or about 15-30 feet, or about 5-20 feet or about 3-15 feet. Other dimensions are within the scope of the present disclosure.

The base 402 may also include one or more cross rails 408, one of which is shown in FIG. 8, extending between and interconnecting the opposite pairs of legs 404. In the illustrated embodiment, the cross rail 408 generally extends between the pivot points (e.g., pins 406) of the legs 404. Other configurations are within the scope of the present disclosure. For example, additional cross rails 408 can be includes that extend between opposite legs at or adjacent to the ends thereof. Other configurations and arrangements of the base 402 are within the scope of the present disclosure. For example, the base can be a tripod, with three legs generally connected at a single pivot point.

The collector 410 of the catcher 400 is configured to catch the package 100, 100', 100" when the package is dropped by the UAV 12 into the collector. The collector 410 is connected to an upper end of the base 402. Generally, the base 402 supports and holds the collector 410 above the base. Desirably, the collector 410 comprises a flexible sheet of material such as a sheet of fabric (e.g., cloth), a net, a tarp, a web, etc. The base 402 generally spreads out (e.g., stretches) the collector 410 when the base is in the deployed position to arrange the collector to receive the package 100, 100', 100". Desirably, a length and/or width of the collector 410 is greater than or equal to two times a dimension of the package 100, 100', 100" to ensure there is a sufficient area for the collector to receive the package after it is dropped by the UAV 12. In one embodiment, the collector 410 may be inherently elastic to provide a cushion for the package 100, 100', 100" when the package hits the collector. In another embodiment, the collector 410 may be connected to the base 402 with an elastic connection (not shown). The collector 410 may define one or more openings or apertures (not shown) spread out over the collector to prevent moisture or water (e.g., rain water) from pooling on the collector. The openings permit moisture to pass through the collector 410. The openings also permit air to flow through the collector 410 so that wind or turbulence from the UAV 12 will not significantly disturb the collector (e.g., invert the collector). Desirably, the collector 410 has an excess amount of material in the width and/or length thereof, relative to the respective width and/or length of the upper end of the base 402, to permit the collector to sag and form an arcuate upper surface to receive the package 100, 100', 100", as shown in FIG. 9.

In one embodiment, all or a portion of an upper surface of the collector 410 may include a machine-readable marking 412 that is configured to be read (e.g., scanned) by the UAV 12. The machine-readable marking 412 represents information or data. Desirably, the machine-readable marking 412 represents an identity of the catcher 400 (e.g., the machine-readable marking is a machine-readable identification marking), although other types of information can also be represented such as delivery destination information (e.g., destination coordinates). Exemplary machine-readable markings 412 include, but are not limited to, linear (e.g., one dimensional) barcodes, matrix barcodes (e.g., two dimensional barcodes, quick response (QR) codes, etc.), and the like. In this embodiment, the UAV 12 may include a scanner 25 configured to read the machine-readable marking 412 and send the information obtained from the marking to the controller. For example, the UAV 12 may scan the machine-readable marking 412 to obtain the identity of the catcher 400 and confirm the delivery and package drop location. For example, the UAV 12 can obtain the identity of the catcher 400 by scanning the machine-readable marking 412 and matching this obtained identity to the identity received from the identification tag 130 on the package 100, 100', 100". It is understood the machine readable marking 412 could be used with any of the catchers 200, 300, 400 described herein.

Alternatively or in addition to representing an identity of the catcher 400, the machine-readable marking 412 may serve as a reference point for the UAV 12 to allow the UAV to determine its position relative to the catcher by scanning the machine-readable marking 412. In this embodiment, the UAV 12 may not need the exact coordinates of the catcher 400, only the general area of where the catcher is located and then use the scanner 25 to find the machine-readable marking and position itself relative to the catcher to drop the package 100, 100', 100".

Similar to catchers 200 and 300, catcher 400 may also include a controller 226, as described above, to communicate with the UAV 12. The controller 226 generally operates in the same manner with catcher 400 as with catchers 200 and 300, and thus a detailed description is omitted here with the understanding that the above description relating to the controller applies to catcher 400 as well. The main difference for the controller 226 when used with catcher 400 is that the controller 226 does not control a prime mover or locking mechanism because the catcher does not have these components. The controller 226 is used to communicate with the UAV 12 as described above. In this embodiment, the catcher 400 may also include a positioning unit 236, as described above.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

It is apparent that the elements, features, and/or teachings set forth in each embodiment disclosed herein are not limited to the specific embodiment(s) the elements, features and/or teachings are described in. Accordingly, it is understood that the elements, features and/or teachings described in one embodiment may be applied to one or more of the other embodiments disclosed herein, even if said elements, features and/or teachings where not described herein as being a part of said one or more of the other embodiments.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

OTHER STATEMENTS OF EXAMPLE EMBODIMENTS

The following are statements of example embodiments described in the present disclosure. Although some of the following statements are not currently presented as claims, the statements are believed to be patentable and may subsequently be presented as claims. Associated methods corresponding to the statements or apparatus or systems below, are also believed to be patentable and may subsequently be presented as claims. It is understood that the following statements may refer to and be supported by one, more than one or all of the embodiments described above.

A1. A pharmaceutical package for carrying a pharmaceutical container, the pharmaceutical package comprising: a first housing defining an interior and a first housing opening sized and shaped to allow the pharmaceutical container to pass into the interior; a second housing in the first housing, the second housing defining a compartment and a second housing opening, the compartment being sized and shaped to receive and carry the pharmaceutical container, the second housing opening being in communication with the compartment and sized and shaped to allow the pharmaceutical container to pass into the compartment; a gas chamber disposed between the first and second housings, the gas chamber configured to hold gas in an inflated state of the gas chamber; a passage extending from the first housing to the second housing and defining a passageway extending between the first housing opening and the second housing opening to allow the pharmaceutical container to be positioned in the compartment of the second housing by moving the pharmaceutical container through the first housing opening, the passageway and the second housing opening; and one or more supports connected to and extending between the first housing and the second housing, the one or more supports securing and holding the second housing in the first housing.

A2. The pharmaceutical package of feature A1, wherein the gas chamber is defined by at least one of the first or second housing.

A3. The pharmaceutical package of feature A1, wherein the gas chamber is defined by the first housing and the second housing.

A4. The pharmaceutical package as in any one of features A1-A3, wherein the passage defines a portion of the gas chamber and is configured to constrict to substantially close the passageway to prevent the pharmaceutical container from moving through the passageway when the gas chamber is filled with the fluid.

A5. The pharmaceutical package of feature A4, wherein the passage bulges inwardly to reduce a width of the passageway relative to widths of the first and second housing openings when the gas chamber is in the inflated state.

A6. The pharmaceutical package as in any one of features A4-A5, wherein a length of the passageway corresponds to a distance from the first housing opening to the second housing opening, and wherein the passage has a passage wall having a length extending between the first and second housing openings, the passage wall length being greater than the passageway length.

A7. The pharmaceutical package as in any one of features A1-A6, further comprising at least one refrigeration pocket on the second housing, the at least one pocket configured to receive and hold a refrigeration packet.

A8. The pharmaceutical package as in any one of features A1-A7, further comprising at least one refrigeration compartment on the second housing, the refrigeration compartment configured to hold a refrigerant.

A9. The pharmaceutical package as in any one of features A1-A8, further comprising an identification tag including an identity of the pharmaceutical package.

A10. The pharmaceutical package of feature A9, wherein the identification tag includes an RFID tag.

A11. The pharmaceutical package as in any one of features A9-A10, wherein the RFID tag includes one or more of prescription information, patient information, delivery destination information, delivery receptacle information, or combinations thereof.

A12. The pharmaceutical package as in any one of features A1-A11, further comprising a carrier connector configured to be coupled to a carrier to couple the pharmaceutical package to a carrier.

A13. The pharmaceutical package of feature A12, wherein the carrier connector is a loop configured to be coupled to a hook of the carrier.

A14. The pharmaceutical package of feature A13, in combination with the carrier, wherein the carrier comprises an unmanned aerial vehicle.

A15. The pharmaceutical package as in any one of features A1-A14, wherein the first housing has an aerodynamic shape.

A16. The pharmaceutical package as in any one of features A1-A14, wherein the first housing has a polyhedron shape.

A17. The pharmaceutical package as in any one of features A1-A16, further comprising a selectively operable valve configured to permit the gas chamber to be selectively filled and emptied with the gas.

A18. The pharmaceutical package as in any one of features A1-A17, further comprising a door configured to close the first housing opening.

A19. The pharmaceutical package as in any one of features A1-A18, further comprising a protective cover over the first housing.

B1. A catcher for catching a package delivered by an unmanned aerial vehicle, the catcher comprising: a chute extending from an upper end to a lower end and defining a passageway between the upper and lower ends, the passageway configured to receive the package when the package is dropped by the unmanned aerial vehicle into the chute; an enclosure mount coupled to the chute and configured to mount to an enclosure to couple the catcher to the enclosure; a door configured to move between an open position and a closed position to open and close the passageway; a door actuator operatively coupled to the door to control the door to permit the package to pass the door; and a controller communicatively coupled to the door actuator and including a communications port, a processor and a non-transitory tangible storage medium including processor executable instructions for controlling the operation of the processor, the instructions including instructions for selectively actuating the door actuator to permit the package to pass the door responsive to the controller receiving a signal from the unmanned aerial vehicle via the communications port.

B2. The catcher of feature B1, wherein the instructions further include instructions for sending an identity of the catcher via the communications port to the unmanned aerial vehicle.

B3. The catcher as in any one of features B1-B2, wherein the instructions further include instructions for selectively activating the door actuator to permit the package to move pass the door to move the door toward the closed position.

B4. The catcher of feature B3, wherein the door actuator comprises a prime mover operatively coupled to the door to move the door between the open and closed positions.

B5. The catcher of feature B4, wherein the instructions further include instructions for selectively activating the prime mover to move the door toward the closed position.

B6. The catcher of feature B3, wherein the door actuator comprises a locking mechanism operatively coupled to the door to lock and unlock the door.

B7. The catcher of feature B6, wherein the instructions further include instructions for selectively activating the locking mechanism to lock and unlock the door.

B8. The catcher as in any one of features B3-B7, wherein the door actuator comprises the prime mover and the locking mechanism.

B9. The catcher as in any one of features B1-B8, wherein the chute has an adjustable height.

B10. The catcher as in any one of features B1-B9, wherein the chute has at least one bend defining at least one bend in the passageway.

B11. The catcher as in any one of features B1-B10, wherein the chute defines at least one opening between the upper end and the lower end configured to permit moisture to flow out of the passageway.

B12. The catcher of feature B11, wherein the chute includes at least one guard, each guard configured to cover one opening of the at least one opening to prevent air and moisture from entering the passageway through said one opening.

B13. The catcher as in any one of features B1-B12, wherein the instructions include instructions for continuously sending a beacon signal to be received by the unmanned aerial vehicle when the unmanned aerial vehicle is in range of the beacon signal.

B14. The catcher of feature B13, wherein the beacon signal includes an identity of the catcher and positional information of the catcher.

B15. The catcher of feature B14, further comprising a positional unit communicatively coupled to the controller, the positional unit configured to generate the positional information and provide the positional information to the controller.

B16. The catcher as in any one of features B1-B15, wherein the door is a first door and further comprising a second door configured to open and close a lower end of the passageway.

B17. The catcher as in any one of features B1-B16, wherein the catcher includes a machine-readable marking configured to be read by the unmanned aerial vehicle.

B18. The catcher as in feature B17, wherein the machine-readable marking represents an identity of the catcher.

B19. The catcher as in feature B17, wherein the machine-readable marking is configured to be used by the unmanned aerial vehicle to identify the precise location of the catcher.

C1. A catcher for catching a package delivered by an unmanned aerial vehicle, the catcher comprising: a base including at least two legs; a collector connected to an upper end of the base and configured to catch the package when the package is dropped by the unmanned aerial vehicle into the collector; and a communications interface configured to communicate with the unmanned aerial vehicle, the communications interface including a communications port configured to send and receive signals from the unmanned aerial vehicle, a processor and a non-transitory tangible storage medium including processor executable instructions for controlling the operation of the processor, the instructions including instructions for sending an identity of the catcher via the communications port to the unmanned aerial vehicle.

C2. The catcher of feature C1, wherein the collector has a width and a length, the width and the length being greater than or equal to two times a dimension of the package.

C3. The catcher as in any one of features C1-C2, wherein the base has a width and a length at the lower end of the base, the width and the length being greater than or equal to two times a dimension of the package.

C4. The catcher as in any one of features C1-C3, wherein the base is collapsible.

C5. The catcher as in any one of features C1-C4, wherein a height of the base is adjustable.

C6. The catcher as in any one of features C1-C5, wherein a width of the base is adjustable.

C7. The catcher as in any one of features C1-C6, wherein the collector includes at least one opening configured to permit moisture to pass through the collector.

C8. The catcher as in any one of features C1-C7, wherein the collector includes a machine-readable marking configured to be read by the unmanned aerial vehicle.

C9. The catcher as in any one of features C1-C8, wherein the instructions include instructions for continuously sending a beacon signal to be received by the unmanned aerial vehicle when the unmanned aerial vehicle is in range of the beacon signal.

C10. The catcher of feature C9, wherein the beacon signal includes an identity of the catcher and positional information of the catcher.

C11. The catcher of feature C10, further comprising a positional unit communicatively coupled to the controller, the positional unit configured to generate the positional information and provide the positional information to the controller.

C12. The catcher as in any one of features C1-B11, wherein the catcher includes a machine-readable marking configured to be read by the unmanned aerial vehicle.

C13. The catcher as in feature C12, wherein the machine-readable marking represents an identity of the catcher.

C14. The catcher as in feature C12, wherein the machine-readable marking is configured to be used by the unmanned aerial vehicle to identify the precise location of the catcher.

D1. A catcher for catching a package delivered by an unmanned aerial vehicle, the catcher comprising: a housing configured to mount to an enclosure to couple the catcher to the enclosure; a collector movably coupled to the housing, the collector movable between a collection position where the collector is configured to receive the package when the package is dropped by the unmanned aerial vehicle and a retracted position; a prime mover operatively coupled to the collector to move the collector between the collection position and the retracted position; a controller communicatively coupled to the prime mover and including a communications port, a processor and a non-transitory tangible storage medium including processor executable instructions for controlling the operation of the processor, the instructions including instructions for selectively activating the prime mover to move the collector toward the collection position responsive to the controller receiving a signal from the unmanned aerial vehicle via the communications port.

D2. The catcher of feature D1, wherein the collector pivotably coupled to the housing.

D3. The catcher as in any one of features D1-D2, wherein the collector includes a first flange and a second flange, the first flange extending generally perpendicular to the second flange.

D4. The catcher of feature D3, wherein the collector is pivotably coupled to the housing adjacent a connection between the first flange and the second flange.

D5. The catcher as in any one of features D1-D4, wherein the collector defines a portion of an exterior surface of the housing when the collector is in the retracted position.

D6. The catcher as in any one of features D1-D5, further comprising a gasket to form a seal between the collector and housing when the collector is in the retracted position.

D7. The catcher as in any one of features D1-D6, further comprising a door configured to permit access to an interior of the housing.

D8. The catcher as in any one of features D1-D7, wherein the instructions include instructions for continuously sending a beacon signal to be received by the unmanned aerial vehicle when the unmanned aerial vehicle is in range of the beacon signal.

D9. The catcher of feature D8, wherein the beacon signal includes an identity of the catcher and positional information of the catcher.

D10. The catcher of feature D9, further comprising a positional unit communicatively coupled to the controller, the positional unit configured to generate the positional information and provide the positional information to the controller.

D11. The catcher as in any one of features D1-D10, wherein the catcher includes a machine-readable marking configured to be read by the unmanned aerial vehicle.

D12. The catcher as in feature D11, wherein the machine-readable marking represents an identity of the catcher.

D13. The catcher as in feature D11, wherein the machine-readable marking is configured to be used by the unmanned aerial vehicle to identify the precise location of the catcher.

The above statements can be combined together in any combination to further provide example embodiments of the present disclosure.

What is claimed is:

1. A catcher for catching a package delivered by an unmanned aerial vehicle, the catcher comprising:
 a housing configured to mount to an enclosure to couple the catcher to the enclosure;
 a collector movably coupled to the housing, the collector movable between a collection position where the collector is configured to receive the package when the package is dropped by the unmanned aerial vehicle and a retracted position;
 a prime mover operatively coupled to the collector to move the collector between the collection position and the retracted position; and
 a controller communicatively coupled to the prime mover and including a communications port, a processor and a non-transitory tangible storage medium including processor executable instructions for controlling the operation of the processor, the instructions including instructions for selectively activating the prime mover to move the collector toward the collection position responsive to the controller receiving a signal from the unmanned aerial vehicle via the communications port.

2. The catcher of claim 1, wherein the collector pivots relative to the housing.

3. The catcher of claim 1, wherein the collector includes a first flange and a second flange, the first flange extending generally perpendicular to the second flange.

4. The catcher of claim 3, wherein the collector is pivotably coupled to the housing adjacent a connection between the first flange and the second flange.

5. The catcher of claim 1, wherein the collector defines a portion of an exterior surface of the housing when the collector is in the retracted position.

6. The catcher of claim 5, further comprising a gasket to form a seal between the collector and housing when the collector is in the retracted position.

7. The catcher of claim 1, further comprising a door configured to permit access to an interior of the housing.

8. The catcher of claim 1, wherein the instructions include instructions for continuously sending a beacon signal to be received by the unmanned aerial vehicle when the unmanned aerial vehicle is in range of the beacon signal.

9. The catcher of claim 8, wherein the beacon signal includes an identity of the catcher and positional information of the catcher.

10. The catcher of claim 9, further comprising a positional unit communicatively coupled to the controller, the positional unit configured to generate the positional information and provide the positional information to the controller.

11. The catcher of claim 1, wherein the instructions include a beacon transmit instruction that is triggered upon receipt of a presence signal from an unmanned aerial vehicle.

12. A catcher for catching a package delivered by an unmanned aerial vehicle, the catcher comprising:
 a housing configured to mount to an enclosure to couple the catcher to the enclosure;
 a collector movably coupled to the housing, the collector including a door movable between a collection position where the collector is configured to receive the package when the package is dropped by the unmanned aerial vehicle and a retracted position;
 a prime mover operatively coupled to the collector to move the door of the collector between the collection position and the retracted position; and
 a controller communicatively coupled to the prime mover and including a communications port, a processor and a non-transitory tangible storage medium including processor executable instructions for controlling the operation of the processor, the instructions including instructions to selectively activate the prime mover to move the door toward the collection position responsive to the controller receiving a signal from the unmanned aerial vehicle via the communications port.

13. The catcher of claim 12, wherein the door pivots relative to the housing from the retracted position to the collection position to receive a package from the unmanned aerial vehicle.

14. The catcher of claim 12, wherein the collector defines a portion of an exterior surface of the housing when the collector is in the retracted position.

15. The catcher of claim 14, wherein the collector includes a gasket to form a seal between the door and housing when the door is in the retracted position.

16. The catcher of claim 12, wherein the instructions include instructions for continuously sending a beacon signal to be received by the unmanned aerial vehicle when the unmanned aerial vehicle is in range of the beacon signal.

17. The catcher of claim 16, wherein the beacon signal includes an identity of the catcher and positional information of the catcher.

18. The catcher of claim 17, further comprising a positional unit communicatively coupled to the controller, the positional unit configured to generate the positional information and provide the positional information to the controller.

19. The catcher of claim 12, wherein the instructions include a beacon transmit instruction that is triggered upon receipt of a presence signal from an unmanned aerial vehicle.

20. A catcher for catching a package delivered by an unmanned aerial vehicle, the catcher comprising:
 a housing configured to mount to an enclosure to couple the catcher to the enclosure, the housing having an interior to receive a package;
 a collector movably coupled to the housing, the collector including a door movable between a collection position where the collector is configured to receive the package when the package is dropped by the unmanned aerial vehicle and a retracted position, the door being in a vertical orientation in the retracted position to close the interior of the housing, the door being in a non-vertical position to form a sloped channel to receive a package into the interior of housing;
 a prime mover operatively coupled to the collector to move the door of the collector between the collection position and the retracted position; and
 a controller communicatively coupled to the prime mover and including a communications port, a processor and a non-transitory tangible storage medium including processor executable instructions for controlling the operation of the processor, the instructions including instructions to selectively activate the prime mover to move the door toward the collection position from the retracted position responsive to the controller receiving a signal from the unmanned aerial vehicle via the communications port.

\* \* \* \* \*